United States Patent [19]

Ashizawa

[11] Patent Number: 5,760,527
[45] Date of Patent: Jun. 2, 1998

[54] VIBRATION ACTUATOR AND METHOD OF CONTROL

[75] Inventor: Takatoshi Ashizawa, Kawasaki, Japan

[73] Assignee: Nikon Corporation, Tokyo, Japan

[21] Appl. No.: 648,515

[22] Filed: May 13, 1996

[30] Foreign Application Priority Data

May 12, 1995 [JP] Japan ................... 7-114882
Apr. 24, 1996 [JP] Japan ................... 8-102805

[51] Int. Cl.$^6$ .......................................... H01L 41/04
[52] U.S. Cl. ............................... 310/317; 318/116
[58] Field of Search ........................... 310/317, 323, 310/325, 333; 318/116, 118, 119

[56] References Cited

U.S. PATENT DOCUMENTS 5,140,231  8/1992  Kashiyama ................ 318/116
5,233,274  8/1993  Honda et al. ................ 310/116

FOREIGN PATENT DOCUMENTS 61-124275  6/1961  Japan.

*Primary Examiner*—Clayton E. LaBalle

[57] ABSTRACT

An ultrasonic actuator which can be accurately controlled at low drive speeds and with reduction in speed irregularities at low speeds. The ultrasonic actuator includes elastic bodies joined to electromechanical conversion elements and a relative motion member in compressive contact with the elastic bodies. A control system outputs first and second drive signals to the electromechanical conversion elements to control the vibration actuator. The control system directly controls the voltage of the first drive signal to independently control the respective voltages of the first drive signal and a second drive signal.

23 Claims, 14 Drawing Sheets

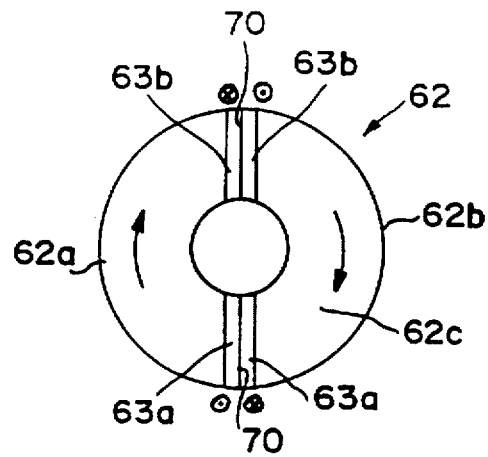
FIG. 10A
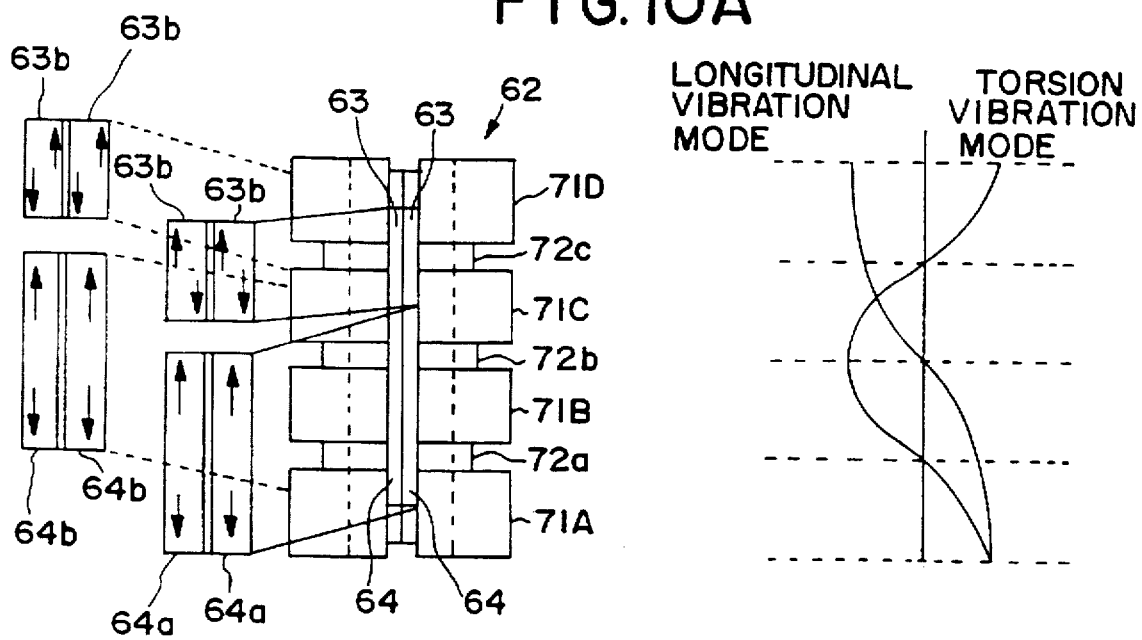
FIG. 10B
FIG. 10C

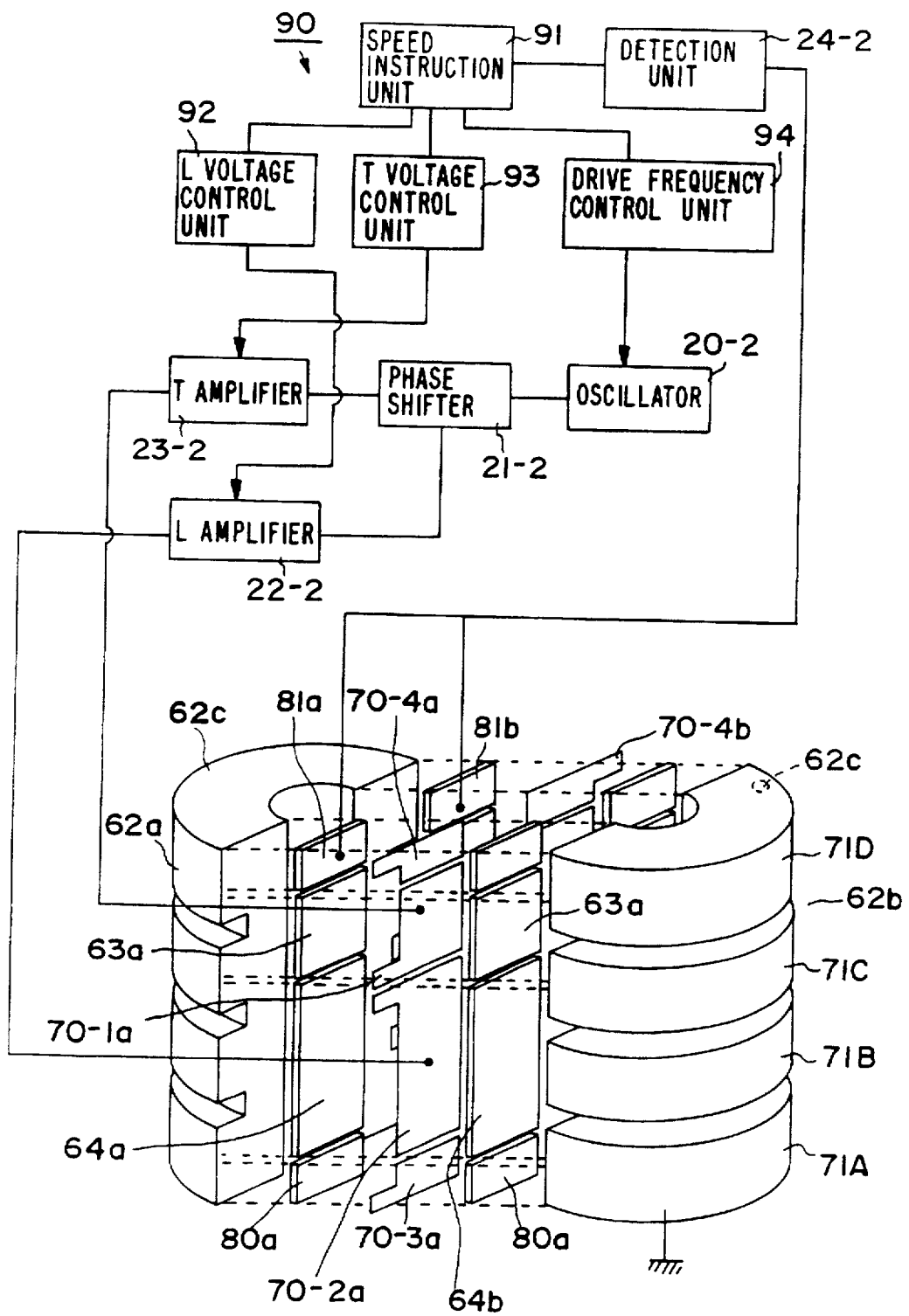
FIG. II

VIBRATION ACTUATOR AND METHOD OF CONTROL

BACKGROUND OF THE INVENTION

1. Field of the Invention

The present invention is related to a vibration actuator and method of controlling the vibration actuator which prevents drive speed irregularities, particularly at low speeds.

2. Description of the Related Art

Traveling wave type vibration actuators (ultrasonic actuators) are known. For example, Nikkei Mechanical, February 1983, discloses a vibration actuator which generates an ultrasonic traveling wave in a driving surface of a fixed element consisting of an elastic body by impressing two drive signals having different phases on the elastic body. A moving element contacts the driving surface of the fixed element and is frictionally driven by elliptical motion of the driving surface generated by the traveling wave generated in the driving surface.

Further, standing wave type vibration actuators are also known. FIG. 15 is an oblique diagram showing the structure of a standing wave type vibration actuator which is a longitudinal-torsional vibration type of vibration actuator. The vibration actuator shown in FIG. 15 consists of a stator 101, which includes an electromechanical conversion element 104 for torsional vibration interposed between two vibration elements 102, 103, and an electromechanical conversion element 105 for longitudinal vibration positioned on the upper side of the vibration element 103. The electromechanical conversion element 104 for torsional vibration is polarized in the circumferential direction. Moreover, the electromechanical conversion element 105 for longitudinal vibration is polarized in the thickness direction. A moving element 106 is located on the upper side of the electromechanical conversion element 105 for longitudinal vibration.

The vibration elements 102, 103 and the electromechanical conversion elements 104, 105 are all fixed to a fixed shaft 107. Specifically, the vibration elements 102, 103 and the electromechanical conversion elements 104, 105 are screwed to a screw portion of the fixed shaft 107. The moving element 106 is disposed to rotate freely via ball bearings 108 on the fixed shaft 107. A nut 110 is screw fastened to an upper end of the fixed shaft 107 and a spring 109 is interposed between the nut 110 and the moving body 106. The moving body 106 and the stator 101 are caused to contact via a compressive force F of the spring 109.

The electromechanical conversion element 104 for torsional vibration and the electromechanical conversion element 105 for longitudinal vibration, are both driven by a voltage generated by an oscillator 111 having the same frequency and phase shifted by a phase shifter 112.

The electromechanical conversion element 104 for torsional vibration provides mechanical displacement causing the moving body 106 to rotate around the fixed shaft 107. The electromechanical conversion element 105 for longitudinal vibration performs the function of converting the vibration arising in the stator 101 to one direction of the moving body 106, by periodically causing movement synchronized with the period of the torsional vibration generated by the electromechanical conversion element 104.

FIG. 16 is an oblique diagram showing an exploded view of a portion of the vibration actuator shown in FIG. 15. As described above, the electromechanical conversion element 104 for torsional vibration is polarized in the circumferential direction. The polarization is accomplished by dividing the electromechanical conversion element 104 into 6–8 small fan-shaped pieces, and each small fan-shaped piece is individually polarized. After polarizing each small piece, the small pieces are assembled in a ring. Moreover, an electrode 104a is provided which receives a voltage from the oscillator 111 and phase shifter 112.

However, in prior art vibration actuator, when assembling the electromechanical conversion element 104 for torsional vibration in a ring, it is difficult to provide dimensional accuracy. As shown in FIG. 15, the respective cross sectional areas of the electromechanical conversion element 105 for longitudinal vibration and of the electromechanical conversion element 104 for torsional vibration are about equal to smaller than the cross sectional area of the stator 101. It is necessary to provide a hole in the electromechanical conversion elements 104, 105 for the fixed shaft 107 to pass through. Because of the necessity of providing a hole for the fixed shaft 107 to pass, the cross sectional area of the electromechanical conversion elements 104, 105 is further reduced, and it is difficult to design the vibration actuator for high torque and high rotation.

In order to solve the above-described problems, the present Applicant has disclosed, for example, in Japanese Patent Applications 6-180279 and 6-275022, vibration actuators which have high torque and high rotation, and, moreover, are of simple structure and are simple to manufacture.

FIG. 17 is a vertical cross section showing an example of the vibration actuator disclosed in Japanese Patent Applications 6-180279 and 6-275022. FIG. 18 is a block diagram of a drive control system for the vibration actuator shown in FIG. 17. Moreover, FIG. 19A is a diagram of the vibration element 2 of the vibration actuator 1 shown in FIG. 17, viewed from the bottom surface direction. The vibration element 2 includes two elastic hemicylindrical bodies 2a, 2b and an electromechanical conversion element 3, 4 sandwiched between the two elastic hemicylindrical bodies 2a, 2b. FIG. 19B is a diagram of the vibration element 2 viewed from a side surface direction. Furthermore, FIG. 20 is a diagram illustrating the drive principle of a vibration actuator caused to exhibit elliptical motion in the driving surface of the assembled vibration element by combining a longitudinal vibration and a torsional vibration of an elastic body.

As shown in FIGS. 17 and 18, the longitudinal and torsional vibration actuator 1 includes a vibration element 2 having columnar elastic bodies 2a, 2b, and plural electromechanical conversion elements 3, 4 interposed between the elastic bodies 2a, 2b. A drive force is generated at a driving surface 2c formed by a top surface of the elastic bodies 2a, 2b by the primary longitudinal vibration and primary torsional vibration arising due to the excitation of the electromechanical conversion elements 3, 4.

The electromechanical conversion elements 3, 4 are piezoelectric elements which are excited by drive signals to convert electrical energy into mechanical energy. The elastic bodies 2a, 2b are members configured as a thick-walled cylinder longitudinally divided into two, with the electromechanical conversion elements 3, 4 interposed in the plane dividing the elastic bodies 2a, 2b. The electromechanical conversion elements 3, 4 consist of a total of four laminated layers. Specifically, the electromechanical conversion element 3 is a torsional vibration electromechanical conversion element consisting of two laminated layers having a piezoelectric constant $d_{15}$. The electromechanical conversion element 4 is a longitudinal vibration electromechanical conversion element consisting of two laminated layers having a piezoelectric constant $d_{31}$.

Through holes 2d, 2e are formed in the elastic bodies 2a, 2b, respectively, parallel to the lamination direction of the electromechanical conversion elements 3, 4 and at about the center of the height direction. Bolts 6a, 6b are inserted into the through holes 2d, 2e, respectively, and are screwed to a fixed shaft 5 which is positioned centrally in the vibration actuator in an axial direction. The bolts 6a, 6b secure the elastic bodies 2a, 2b, respectively, such that the elastic bodies 2a, 2b sandwich the electromechanical conversion elements 3, 4.

A moving element 7 is a relative motion member and includes a moving element base material 7-1, and a sliding member 7-2 which contacts the driving surface 2c of the vibration element 2. The moving element 7 is positioned with respect to the fixed shaft 5 by a locating member 8 which is fitted into an inner circumference of the moving element 7. The moving element 7 is forced to contact the driving surface 2c of the vibration element 2 by the compressive force of a compression device 9 including an adjusting member 9b and a compression member 9a. The fixed shaft 5 has a threaded portion formed at its end, and the adjusting member 9b is screwed on to the end of the fixed shaft 5 to adjust the amount of compression of the compression member 9a.

FIG. 18 shows a drive control system for driving the vibration actuator 1 shown in FIG. 19. As shown in FIG. 18, the drive control system includes an oscillator 10 to generate drive signals, and a phase shifter 11 to divide the drive signal from the oscillator 10 into signals which have a (1/4) λ (wavelength) phase difference. A T amplifier 13 amplifies the drive signals (first drive signals) input to the electromechanical conversion element 3 for torsional vibration, and an L amplifier 12 amplifies the drive signals (second drive signals) input to the electromechanical conversion element 4 for longitudinal vibration.

Moreover, the drive control system includes a detection unit 14 to detect torsional vibration, and a control unit 15 to control the frequency, voltage, etc., of the oscillator 10 according to the quantity of vibration detected by the detection unit 14. The detection unit 14 includes a piezoelectric body 14a which is affixed to the side surface of the vibration element 2, and detects the deformation of the vibration element 2 accompanying the torsion, thereby indirectly detecting the torsional deformation arising in the elastic bodies 2a, 2b.

As shown in FIGS. 19A and 19B, the electromechanical conversion elements 3, 4 consist of two groups interposed between the two elastic bodies 2a, 2b. The two groups collectively consist of four layers, two layers from the electromechanical conversion element 3 having the piezoelectric constant $d_{15}$, and the remaining two layers from electromechanical conversion element 4 having the piezoelectric constant $d_{31}$.

When excited by a voltage, the electromechanical conversion element 3 having the piezoelectric constant $d_{15}$ causes shearing deformation with respect to the length direction (axial direction) of the elastic bodies 2a, 2b. As shown in FIG. 19A, the electromechanical conversion element 3 is positioned such that the shearing deformation is alternately in the foreground direction X and in a direction Y, opposite to the foreground direction X. When the shearing deformation occurs, the electromechanical conversion element 3 positioned as described above causes torsional deformations to arise in the vibration element 2, and the bottom surface of the vibration element 2 is in torsional motion due to the torsional deformations.

When excited by a voltage, the electromechanical conversion element 4 having the piezoelectric constant $d_{31}$ causes an expansion and contraction deformation with respect to the length direction of the elastic bodies 2a, 2b. Four electromechanical conversion elements 4 for longitudinal vibration are positioned such that, when a potential is impressed on all of the electromechanical conversion elements 4, the deformation arises in the same direction. When the electromechanical conversion element 3 for torsional vibration and the electromechanical conversion element 4 for longitudinal vibration are arranged in the above-described manner, torsional vibrations are generated in the vibration element 2 by a sine wave voltage input to the electromechanical conversion element 3 for torsional vibration. Moreover, a sine wave voltage input to the electromechanical conversion element 4 for longitudinal vibration causes expansion and contraction vibrations to be generated in the vibration element 2.

Accordingly, when drive signals having a sine-wave type periodicity are applied to the electromechanical conversion elements 3, 4 from the oscillator 10, via the phase shifter 11, the T amplifier 13 and the L amplifier 12, the electromechanical conversion elements 3, 4 are excited, and torsional and longitudinal vibrations are respectively generated.

The operation of the vibration actuator 1 will now be described with reference to FIG. 20. As shown in FIG. 20, when the phase difference of the period of the torsional vibration T and the period of the longitudinal vibration L is displaced by (1/4) λ, elliptical motion arises at a point A on the driving surface 2c. When the drive frequency is f, and the angular frequency at this time is ω, at the instant $t=(6/4) \cdot (\pi/\omega)$, the deformation caused by the torsional vibration T is a maximum at the left-hand side, and the deformation caused by the longitudinal vibration L is zero. In this state, the moving element 7 is in compression contact with the driving surface 2c of the vibration element 2 due to the compression member 9a.

From this state, until $t=(7/4) \cdot (\pi/\omega)$ to 0 to $(2/4) \cdot (\pi/\omega)$, the torsional vibration T causes deformation from a maximum at the left-hand side to a maximum at the right-hand side. Moreover, the longitudinal vibration L, after having caused deformation from zero to a maximum at the upper side, again returns to zero. Accordingly, the driving surface 2c of the vibration element 2, while pressing against the moving element 7, rotates in a right-hand direction, and the moving element 7 is driven by this rotation.

Next, from $t=(2/4) \cdot (\pi/\omega)$, until $(6/4) \cdot (\pi/\omega)$, the torsional vibration T causes deformation from a maximum on the right-hand side to a maximum at the left-hand side. Moreover, the longitudinal vibration L, after causing deformation to an upper side maximum, again returns to zero. Accordingly, a point A on the driving surface 2c of the vibration element 2 rotates in the left-hand direction, while separated from the moving element 7, and the moving element 7 is not driven. Further, at this time, the moving element 7 does not follow the contraction of the vibration element 2 because it is compressed by the compression member 9a and its characteristic frequency is different.

If the longitudinal vibrations and torsional vibrations arising in the vibration element 2 are caused to be approximately in coincidence at a common frequency, the longitudinal vibration and the torsional vibration arise simultaneously (degenerating), and a drive force arises which causes an elliptical motion in the driving surface 2c of the vibration element 2. As a result of the elliptical motion in the driving surface 2c, the moving element 7 rotates.

However, when controlling the drive speed of a traveling wave vibration actuator, as shown in Nikkei Mechanical, Feb. 28, 1983, page 46, FIG. 6, the voltage value of the drive signal input to each electromechanical conversion element is controlled at the same rate of change. The voltage value of the drive signal input to respective electromechanical conversion elements is controlled to have the same rate of change because, when the input voltage values of drive signals having different phases are not controlled to be simultaneously the same, the waveform of the traveling wave is disordered, and elliptical motion does not arise in the driving surface. As a result, the driving of the moving element 7 becomes difficult. In the prior art traveling wave type of vibration actuator, the magnitude of the elliptical vibration generated in the driving surface of the stator (vibration element) changes analogously with the change of the voltage of the drive signal. As a result, the drive speed and drive force of the moving element change. In a traveling wave vibration actuator, the contact of the elastic body and moving element is normally at a point or in a line at the front part of the traveling wave. Accordingly, the elliptical motion becomes small, as does the drive force transmitted to the moving element. Accordingly, by causing the reduction of the two phases of drive voltage at the same rate of change in the same amount of time, the drive speed can be made to fall to a low speed, and at the low speed irregularities of the drive speed arise with difficulty.

Furthermore, as shown in FIGS. 17–20, in a longitudinal and torsional type of vibration actuator, as a displacement arises in the drive direction due to the drive signal having a first phase, a displacement arises in the perpendicular direction due to the drive signal having a second phase. Specifically, the first phase drive signal relates to the generation of a drive force, and the second phase drive signal acts as a clutch mechanism related to the transmission of motive power of the drive force.

When controlling the drive speed of the longitudinal and torsional vibration actuator as shown in FIGS. 17–20, when the voltage values of the two drive signals output from the L amplifier 12 and the T amplifier 13 are made small at the same rate of change, the elliptical motion also becomes correspondingly small. Accordingly, the component of the elliptical motion in the drive direction also becomes small, and the drive speed is reduced.

However, because the voltage values of the two drive signals output from the L amplifier 12 and the T amplifier 13 are made small, the components of the elliptical motion in the drive direction and perpendicular to the drive direction also become small. As a result, the magnitude of the elliptical motion component in the perpendicular direction becomes insufficient for the clutch mechanism when the surface roughness of the driving surface 2c becomes small. Accordingly, a problem arises in the vibration actuator shown in FIGS. 17–20, in that the operation of the clutch mechanism at low speeds is inferior, and can not maintain a constant speed.

In contrast, when the voltage values of the two drive signals are both large, the elliptical motion components in the drive direction and perpendicular to the drive direction also become large. As a result, when the magnitude of the elliptical motion component in the perpendicular direction becomes greater than a predetermined range, the clutch mechanism is insufficient and efficiency decreases. Accordingly, a problem arises in that there is a limit to driving at a stabilized speed, and speed irregularity arises at high speeds which exceeded this limit.

SUMMARY OF THE INVENTION

It is an object of the present invention to provide a vibration actuator and a method of controlling the vibration actuator which suppresses irregularity of speed, particularly during very low speed driving, and can perform accurate control of drive speed in a very low speed region.

Additional objects and advantages of the invention will be set forth in part in the description which follows, and, in part, will be obvious from the description, or may be learned by practice of the invention.

Objects and advantages of the present invention are attained with a vibration actuator comprising a vibration element, an elastic body and an electromechanical conversion element joined to the elastic body. A relative motion member is in contact, in a compressed state, with a driving surface of the vibration element and is driven by the driving surface of the vibration element. A drive circuit generates drive signals which are output to the electromechanical conversion element, and by exciting the electromechanical conversion element with a first drive signal and a second drive signal from the drive circuit, a displacement is generated, which gives rise to a first vibration mode in the driving surface, in about the same direction as the relative motion, and a displacement is generated, which gives rise to a second vibration mode, in an intersecting direction to the driving surface.

The drive circuit controls the voltage of the first drive signal and/or second drive signal. The drive circuit may control the first drive signal and the second drive signal independently of each other.

The drive circuit generates the first vibration mode in accordance with the first drive signal, and generates the second vibration mode in accordance with the second drive signal, and controls the voltage of the second drive signal such that the amplitude of vibration of the second drive mode is within a predetermined range.

The drive circuit may control the voltage of the first drive signal such that the amplitude of the vibration of the first drive mode is reduced.

The drive circuit may control the drive frequency of the first drive signal and/or second drive signal.

The elastic body comprises two columnar elastic bodies and a portion of the electromechanical conversion element is interposed between the elastic bodies. If m, n are optional integers, the first vibration mode, as a m-th order torsional vibration having a rotation axis in the about the same location as the central axis of the elastic bodies, the second vibration mode can be a n-th order longitudinal vibration in about an axial direction of the rotation axis. For example, a vibration arising in the elastic bodies can vibrate in a first order longitudinal vibration and a first order torsional vibration, or in a first order longitudinal vibration and a second order torsional vibration.

The drive circuit may control the relative motion speed of the elastic bodies and the relative motion member by changing the voltage of the first drive signal.

The drive circuit may make the voltage of the first drive signal large when the relative motion speed of the elastic bodies and the relative movement member is made large.

The drive circuit may make the voltage of the first drive signal small when the relative motion speed of the elastic bodies and the relative movement member is made small.

The drive circuit may control the relative motion speed of the elastic bodies and the relative motion member by changing the frequency of the first drive signal and second drive signal and, by changing the voltage of the second drive signal.

The drive circuit may make the frequency of the first drive signal and second drive signal low, and may make the voltage of the second drive signal large.

The drive circuit may make the frequency of the first drive signal and second drive signal high, and may make the voltage of the second drive signal small.

According to the present invention, during the output of the first drive signal and second drive signal to the electromechanical conversion element, the voltage of the first drive signal and/or the second drive signal is directly controlled. Accordingly, by controlling the voltage of the first drive signal and the second drive signal, it is possible to control them independently of each other.

Moreover, by controlling the signal voltage of one of the first drive signal and second drive signal, the amplitude of vibration of the second vibration mode can be maintained within a predetermined range. Accordingly, when the amplitude of vibration of the second vibration mode driven by the second drive signal is used as a clutch mechanism, by controlling the voltage of the second drive signal, it is possible to maintain the clutch component as necessary.

Furthermore, when controlling the first vibration mode by the first drive signal, it is possible to change the amplitude of vibration of the first vibration mode. Accordingly, it is possible to change the relative motion speed of the elastic bodies and the relative movement member. If the voltage of the first drive signal is large, the vibration amplitude of the first vibration mode becomes large, and the relative movement speed becomes large. Moreover, if the voltage of the first drive signal is reduced, the vibration amplitude of the first vibration mode becomes small, and the relative movement speed becomes small. At this time, because the voltage of the second drive signal is not changed, the clutch mechanism is maintained unchanged, and the relative motion speed can be changed.

Further, if the voltage of the drive signal and the drive frequency of the drive signal are controlled in a wider range, the first drive signal and second drive signal can be independently controlled. For example, if the drive frequency of the first drive signal and second drive signal is increased, and the voltage of the second drive signal is made large, the necessary clutch mechanism is maintained unchanged, and the relative motion speed can be made small. If the drive frequency of the first drive signal and second drive signal is reduced, and the voltage of the second drive signal is reduced, the necessary clutch mechanism is maintained unchanged, and the relative motion speed can be made large.

In the above-described manner, in accordance with the present invention, regardless of whether the relative motion speed is large or small, the necessary clutch mechanism can be maintained unchanged. Accordingly, stable driving is possible at very low speeds or at high speeds.

BRIEF DESCRIPTION OF THE DRAWINGS

These and other objects and advantages of the invention will become apparent and more readily appreciated from the following description of the preferred embodiments, taken in conjunction with the accompanying drawings, of which:

FIG. 10A is a top view of a vibration element showing a location of an electromechanical conversion element in accordance with the fourth embodiment of the present invention.

FIG. 10B is a side view of the vibration element shown in FIG. 10A.

FIG. 10C is a graph showing a longitudinal vibration mode and a torsional vibration mode caused by excitation of the electromechanical conversion element.

FIG. 11 is a diagram showing a vibration actuator and a control system for the vibration actuator in accordance with the fourth embodiment of the present invention.

DETAILED DESCRIPTION OF THE PREFERRED EMBODIMENTS

Figure 1:
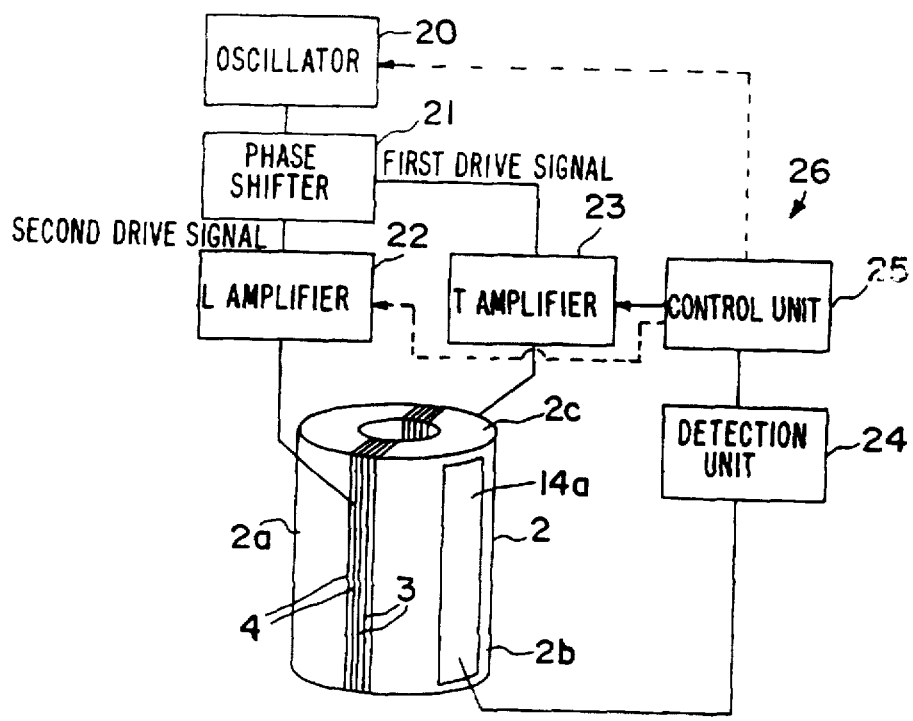
FIG. 1 is a block diagram of a vibration actuator and a control system for the vibration actuator in accordance with a first embodiment of the present invention.

Reference will now be made in detail to the preferred embodiments of the present invention, examples of which are illustrated in the accompanying drawings wherein like reference numerals refer to the same or similar elements throughout.

Figure 2:
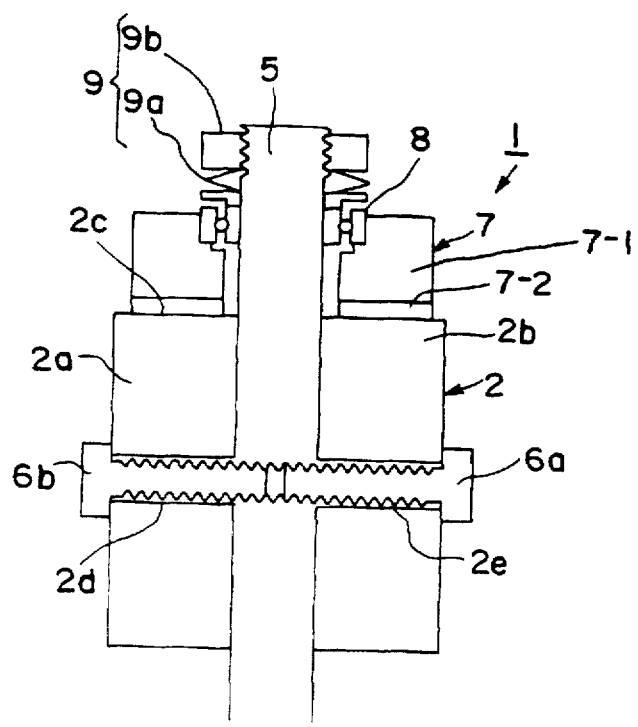
FIG. 2 is a vertical cross section of the vibration actuator in accordance with the first embodiment of the present invention.
Figure 17:
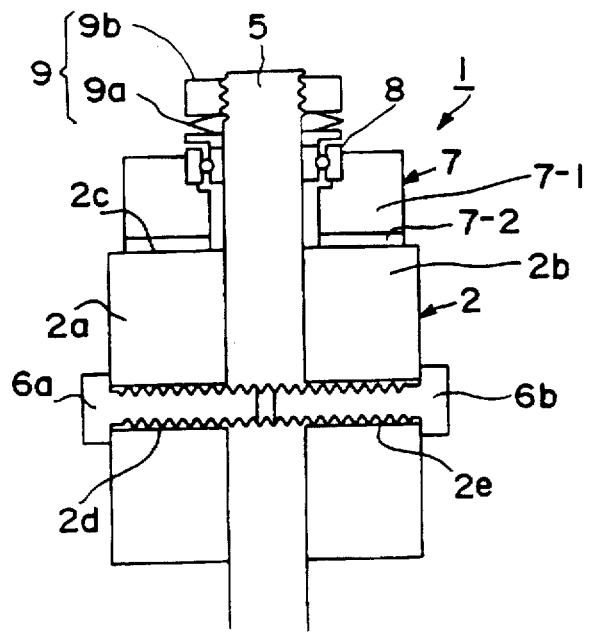
FIG. 17 is a vertical cross section of a conventional vibration actuator.

FIG. 1 is a block diagram of a vibration actuator and a control system for the vibration actuator in accordance with a first embodiment of the present invention. FIG. 2 is a vertical cross section of the vibration actuator in accordance with the first embodiment of the present invention. The vibration actuator shown in FIG. 2 is the same as the vibration actuator shown in FIG. 17. Accordingly, the description of FIG. 2 is the same as that provided for FIG. 17 and a detailed description of FIG. 2 will not be provided here.

Figure 18:
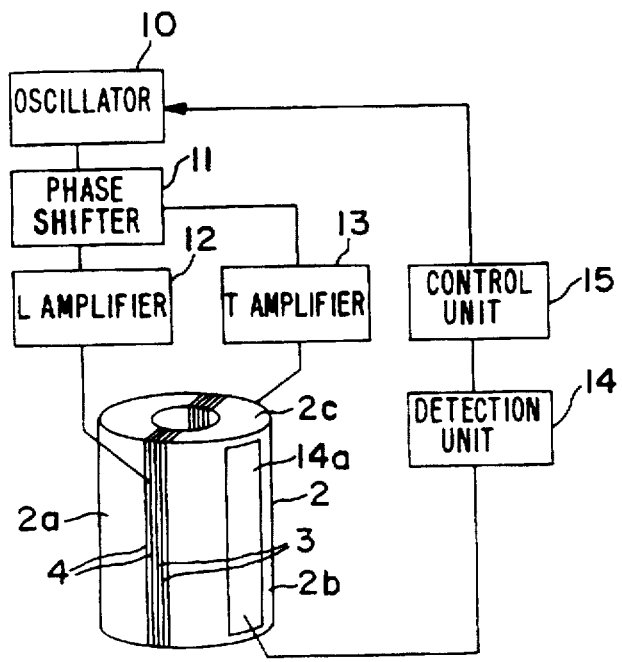
FIG. 18 is a block diagram of a conventional control system for a vibration actuator.
Figure 19A:
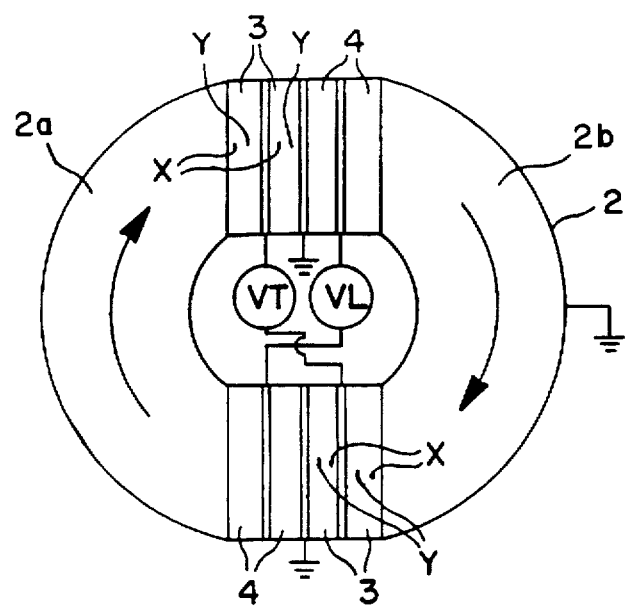
FIG. 19A is a bottom view of a vibration element of a conventional vibration actuator.
Figure 19B:
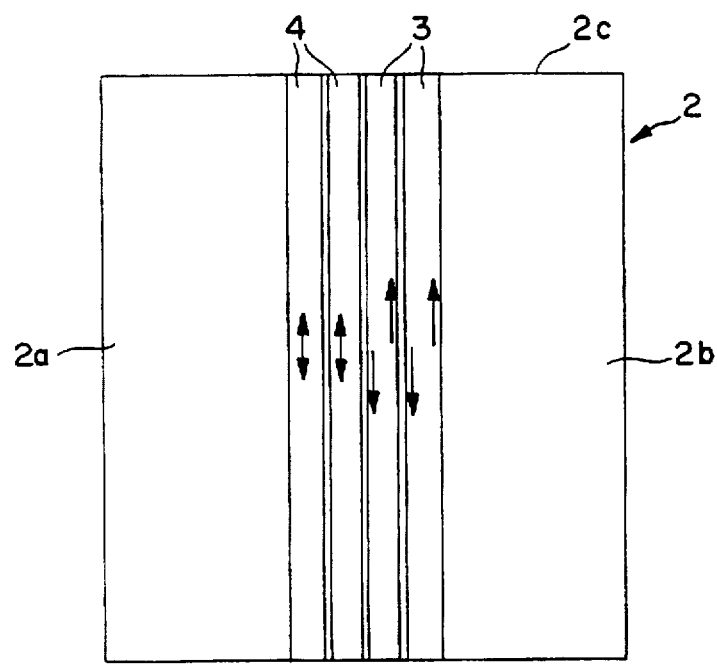
FIG. 19B is a side view of the vibration element of the vibration actuator shown in FIG. 19A.
Figure 20:
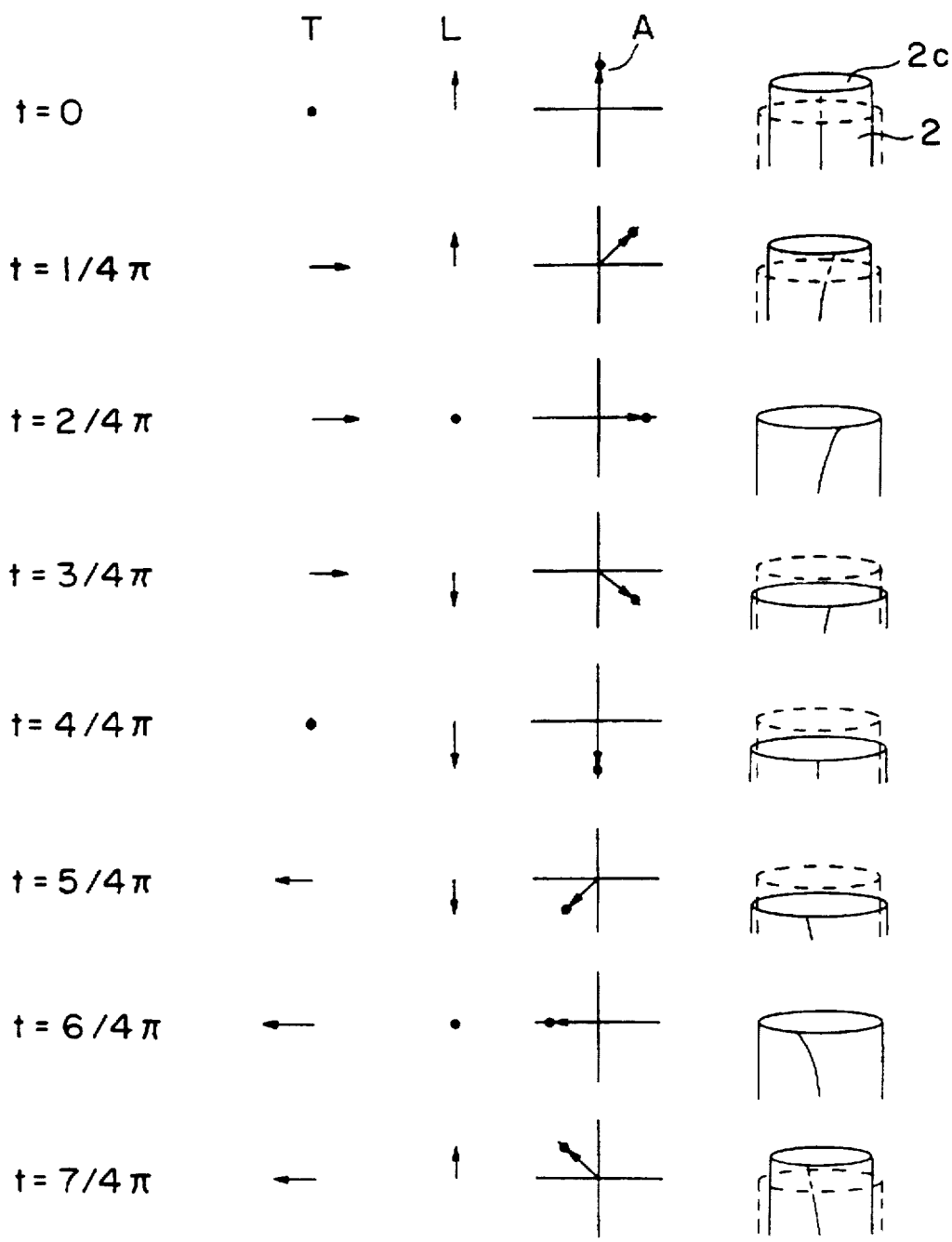
FIG. 20 is a diagram showing a drive of a conventional vibration actuator with respect to time.

In accordance with the first embodiment of the present invention, the drive control system shown in FIG. 18 is modified such that direct control is performed with respect to the voltage of the first drive signal and/or the second drive signal.

As shown in FIG. 1, the drive control system 26 in accordance with the first embodiment of the present invention includes an oscillator 20 which generates a drive signal, a phase shifter 21 which divides the drive signal into a first drive signal and a second drive signal, a T amplifier 23 which amplifies the first drive signal and inputs the first drive signal to an electromechanical conversion element 3 for torsional vibration, and an L amplifier 22 which amplifies the second drive signal and inputs the second drive signal to an electromechanical conversion element 4 for longitudinal vibration.

Furthermore, the drive control system 26 includes a detection unit 24 to detect torsional vibration arising in the vibration element 2, and a control unit 25 to control the gain of the T amplifier 23 (or the L amplifier 22) according to the quantity of torsional vibration detected by the detection unit 24. The detection unit 24 includes a piezoelectric element 14a which is affixed to the sidewall of the vibration element 2. The piezoelectric element 14a can indirectly detect torsional deformation which arises in the vibration element 2 by detecting the deformation which arises accompanying the torsional vibration.

The oscillator 20 generates a drive signal of controlled frequency, and the generated drive signal is divided by the phase shifter 21 into a first drive signal and a second drive signal which are different in phase by (1/4) λ (wavelength). The first drive signal is input to the T amplifier 23, and the second drive signal is input to the L amplifier 22. The amplified first drive signal is input to the electromechanical conversion element 3 for torsional vibration. Further, the amplified second drive signal is input to the electromechanical conversion element 4 for longitudinal vibration. Excitation of the electromechanical conversion element 3 for torsional vibration by the first drive signal generates torsional vibrations in the elastic bodies 2a, 2b. Excitation of the electromechanical conversion element 4 for longitudinal vibration by the second drive signal generates longitudinal vibrations in the elastic bodies 2a, 2b. As a result of the excitation of the electromechanical conversion elements 3, 4, an elliptical motion arises in the driving surface 2c of the vibration element 2 synthesized from the torsional vibration and the longitudinal vibration.

As shown in FIG. 2, the elliptical motion of the driving surface 2c drives the moving element 7, which is a relative motion member. Specifically, the moving element 7 is in contact in a compressed state with the driving surface 2c of the vibration element 2 and receives drive force frictionally from the driving surface 2c.

The drive speed of the moving element 7 can be indirectly monitored by the signal from the piezoelectric element 14a which is affixed to the vibration element 2. When the drive speed of the moving element 7 is large, the amplitude of the torsional vibration detected by the piezoelectric element 14a is large, and a large voltage arises. In contrast, when the drive speed of the moving element 7 is small, the amplitude of the torsional vibration is small, and a small voltage arises.

In accordance with the first embodiment of the present invention, the control unit 25 controls the drive speed of the moving element 7 by adjusting the voltage quantity of the drive signals. Specifically, in accordance with the first embodiment of the present invention, the signal from the control unit 25 is input to the T amplifier 23 to adjust the gain of the T amplifier 23. The drive speed of the moving element 7 is controlled by controlling the gain of the T amplifier 23 which adjusts the voltage quantity of the first drive signal. When the drive speed of the moving element 7 is greater than the desired drive speed, the gain of the T amplifier 23 is reduced. However, when the drive speed of the moving element 7 is smaller than a desired drive speed, the gain of the T amplifier 23 is increased. During the adjustment of the gain of the T amplifier 23, the gain of the L amplifier 22 is not changed. Accordingly, the vibration actuator shown in FIG. 2 can change the drive speed, while the necessary clutch mechanism is maintained unchanged.

Moreover, in accordance with the first embodiment of the present invention, the gain of the T amplifier 23 is controlled by the control unit 25; however, the present invention is not limited to controlling the gain of the T amplifier 23. For example, the gain of the L amplifier 22 may be controlled, or the gains of both the T amplifier 23 and the L amplifier 22 may be controlled.

Figure 3A:
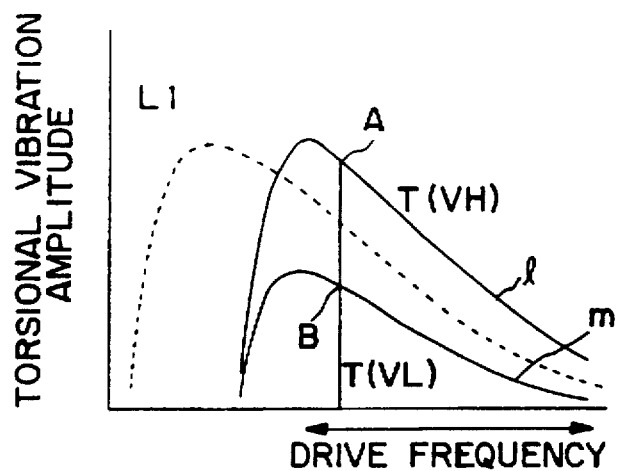
FIG. 3A is a graph showing a relationship between drive frequency and torsional vibration amplitude for a vibration actuator in accordance with the first embodiment of the present invention.
Figure 3B:
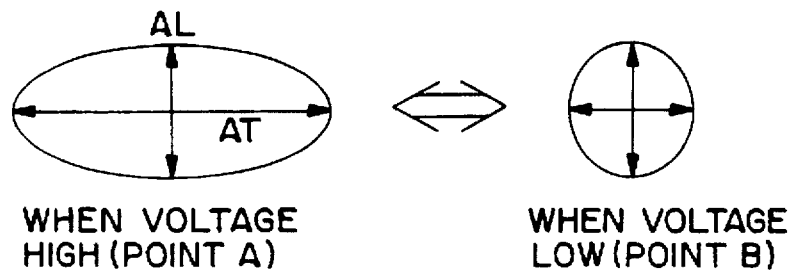
FIG. 3B is a diagram showing a relationship between a change of the elliptical motion of the driving surface of the vibration actuators and a change in the drive voltage in accordance with the first embodiment of the present invention.
Figure 3C:
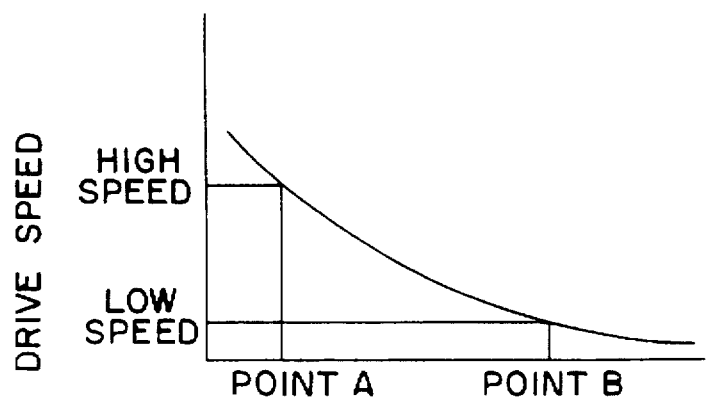
FIG. 3C is a graph showing the relationship between a drive speed and a change in torsional vibration of an electromechanical conversion element in accordance with the first embodiment of the present invention.

FIGS. 3A-3C are descriptive diagrams showing the amplitude of the torsional vibration, the elliptical motion of the drive surface, and the drive speed when changing the voltage value of the first drive signal input to the electromechanical conversion element 3 for torsional vibration.

Specifically, FIG. 3A is a graph of torsional vibration amplitude versus drive frequency for different voltage values of the first drive signal. As shown in FIG. 3A, when the voltage of the first drive signal input to the electromechanical conversion element 3 is reduced, the drive frequency—torsional vibration amplitude curve changes from a curve 1 to a curve m, and the amplitude of the torsional vibration becomes small. At this time, the voltage of the second drive signal for controlling longitudinal vibration is constant. As shown in FIG. 3B, when the voltage of the first drive signal input to the electromechanical conversion element 3 is reduced and the voltage of the second drive signal for controlling longitudinal vibration is constant, the elliptical motion of the drive surface 3c changes from an oblong shape to an upright shape. FIG. 3C is a graph showing the change in drive speed as the torsional vibration of the electromechanical conversion element 3 is reduced corresponding to the reduction in voltage of the first drive signal. As shown in FIG. 3C, only the speed component in the drive direction becomes smaller from point A to point B. Accordingly, the drive speed of the moving element 7 can become smaller with the necessary clutch height maintained unchanged.

Thus, in accordance with the first embodiment of the present invention, even when the voltage of the first drive signal is reduced, because the amplitude of the longitudinal vibration is constant, and unrelated to the magnitude of the torsional vibration, the moving element 7 is unaffected by the surface roughness of the driving surface 2c of the elastic bodies 2a, 2b. Accordingly, low speed drive which was impossible in the prior art (particularly the very low speed drive) can be effected without the generation of speed irregularities.

Furthermore, when the voltage of the first drive signal is made large, the amplitude of the torsional vibration becomes large. Because the voltage of the second drive signal for the longitudinal vibration is constant during the increase in the voltage of the first drive signal, the elliptical motion of the driving surface 2c changes from an upright configuration to an oblong configuration, as shown in FIG. 3B. Accordingly, as shown in FIG. 3C, because only the speed component in the drive direction can increase from point B to point A, the speed of movement of the moving element 7 can be large, with the necessary clutch height maintained unchanged.

In the above-described manner, the amplitude of the longitudinal vibration generated by the second drive signal can be maintained within a predetermined range, while the voltage of the first drive signal is caused to change, thereby varying the drive speed of the moving element 7.

Figure 4:
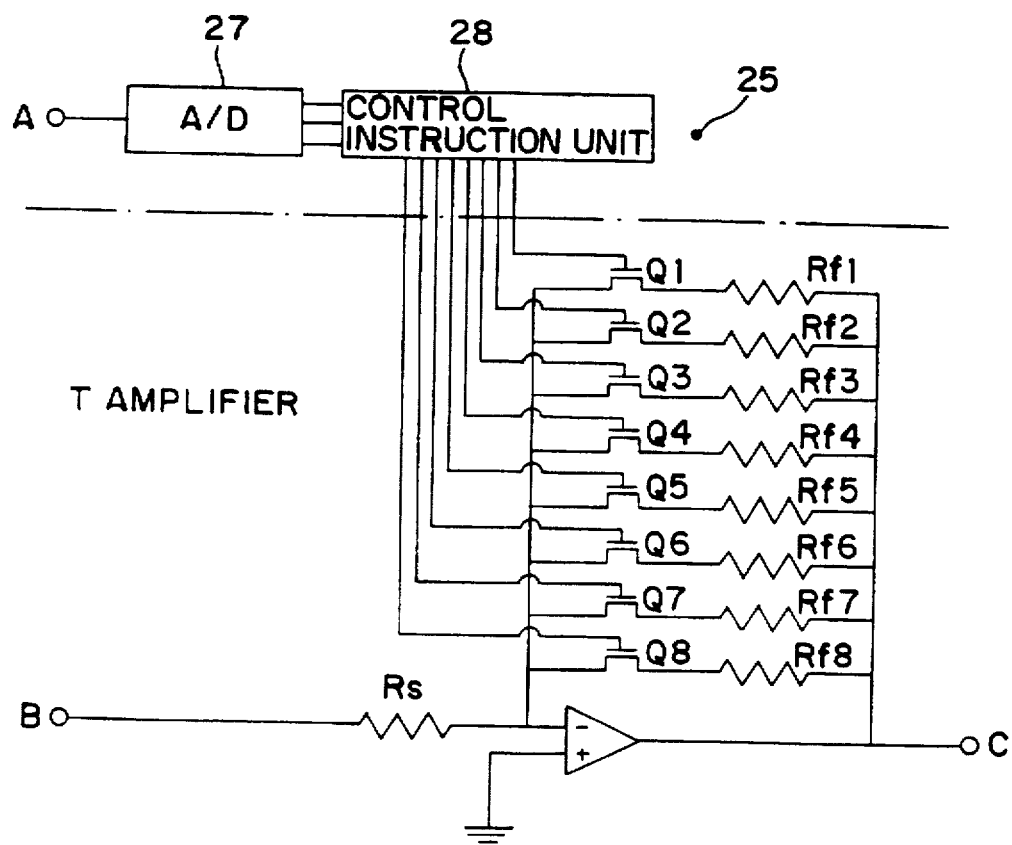
FIG. 4 is a circuit diagram of a device to change an amount of amplification of a drive signal in accordance with the first embodiment of the present invention.

FIG. 4 is a circuit diagram of a device to change the amount of amplification of the drive signals in accordance with embodiments of the present invention.

As shown in FIG. 4, the control unit 25 includes an A/D converter 27 and a control instruction unit 28. Movement speed control signals are input to a terminal A of the A/D converter as analog signals. The movement speed control signals are changed to a large value to cause an increase of speed, and are changed to a small value to cause a speed reduction.

An analog control signal value Vs is input to the terminal A of the A/D converter 27, and the A/D converter 27 outputs a corresponding digital signal Sd to the control instruction unit 28. The control instruction unit 28 acts as a control signal generator, and selects a signal to output in a manner similar to a multiplexer based on the digital input signal Sd. The signal output by the control instruction unit 28 is used to select a switching element Q1–Q8 of the T amplifier. The switching elements Q1–Q8 comprise MOS field effect transistors, or the like switching elements, which can be set ON or OFF by the control signals output from the control instruction unit 28.

The control instruction unit 28 receives the digital signals Sd from the A/D converter 27, selects a switching element Q1–Q8 according to the digital signal Sd, and transmits an ON signal to the selected switching element Q1–Q8. The selected switching element Q1–Q8 which is set ON opens a return portion of a calculator amplifier connected to a respective resistor Rf1–Rf8.

The respective resistors Rf1–Rf8 have different resistance values and are connected in parallel to the return portion of the calculator amplifier. Each resistor Rf1–Rf8 can set a different gain of the calculator amplifier when a respective series connected switching element Q1–Q8 is set ON by a control signal from the control instruction unit 28. In accordance with the amplification device shown in FIG. 4, the drive signal which is input to the terminal B is amplified by the calculator amplifier and the amplified drive signal is output from the terminal C.

The operation of changing the amplification factor of the T amplifier 23 will now be described with reference to FIG. 4. The case in which the speed of movement of the moving element 7 is reduced will be described first. To reduce the speed of movement of the moving element 7, the gain of the T amplifier 23 is reduced. To reduce the gain of the T amplifier 23, the value Vs of the analog control signal input to the terminal A becomes small, and a switching element Q1–Q8 corresponding to the value Vs input to the terminal A is set ON. The switching element Q1–Q8 which is set ON connects a respective resistor Rf1–Rf8 to a feedback portion of the amplifier to reduce the gain of the T amplifier 23. As the gain of the amplifier is reduced, the voltage of the control signal input to the electromechanical conversion element 3 for generating torsional vibration becomes smaller, and the drive speed is reduced.

The case in which the speed of movement of the moving element 7 is increased will now be described. To increase the speed of movement of the moving element 7, the gain of the T amplifier 23 is increased. To increase the gain of the T amplifier 23, the value Vs of the analog control signal input to the terminal A becomes large, and a switching element Q1–Q8 corresponding to the value Vs input to the terminal A is set ON. The switching element Q1–Q8 which is set ON connects a respective resistor Rf1–Rf8 to a feedback portion of the amplifier to increase the gain of the T amplifier 23. As the gain of the amplifier is increased, the voltage of the control signal input to the electromechanical conversion element 3 for generating torsional vibration becomes larger, and the drive speed is increased.

In accordance with embodiments of the present invention, the digital signal Sd from the A/D converter 27 may be three (3) bits, allowing the selection of up to eight (8) switching elements Q1–Q8 and resistors Rf1–Rf8. However, the digital signal from the A/D converter 27 may be two (2) bits, allowing the selection of up to four (4) switching elements and resistors. Further, the digital signal from the A/D converter 27 may be four (4) bits, allowing the selection of up to sixteen (16) switching elements Q and resistors Rf. The more numerous the numbers of switching elements and resistors which can be selected, the finer the possible control.

Moreover, in accordance with the first embodiment of the present invention, an electromechanical conversion element 14a affixed to the vibration element 2 is used as the detection unit 24. However, the drive speed of the moving element 7 may be detected in a direct manner, for example, by using an encoder or the like.

In accordance with the first embodiment of the present invention, the T amplifier 23 is controlled directly from the control unit 25, and the drive speed can be made a reduced speed (particularly, a very low speed). Further, the amplitudes of vibration of the respective clutch component and the drive component of the elliptical motion can be non-uniformly controlled. Accordingly, the amplitude of the vibration of the necessary clutch component can be maintained unchanged, and the drive components can be changed. In contrast, according to the prior art control method, only the drive frequency from the oscillator 20 is controlled. When the drive frequency becomes large, the drive component which acts as the clutch component of the elliptical motion becomes small.

A vibration actuator in accordance with a second embodiment of the present invention will now be described below with reference to FIG. 5. Like elements in the descriptions of the first and second embodiments are referred to by like reference numerals, and a detailed description of these elements will not be repeated.

Figure 5:
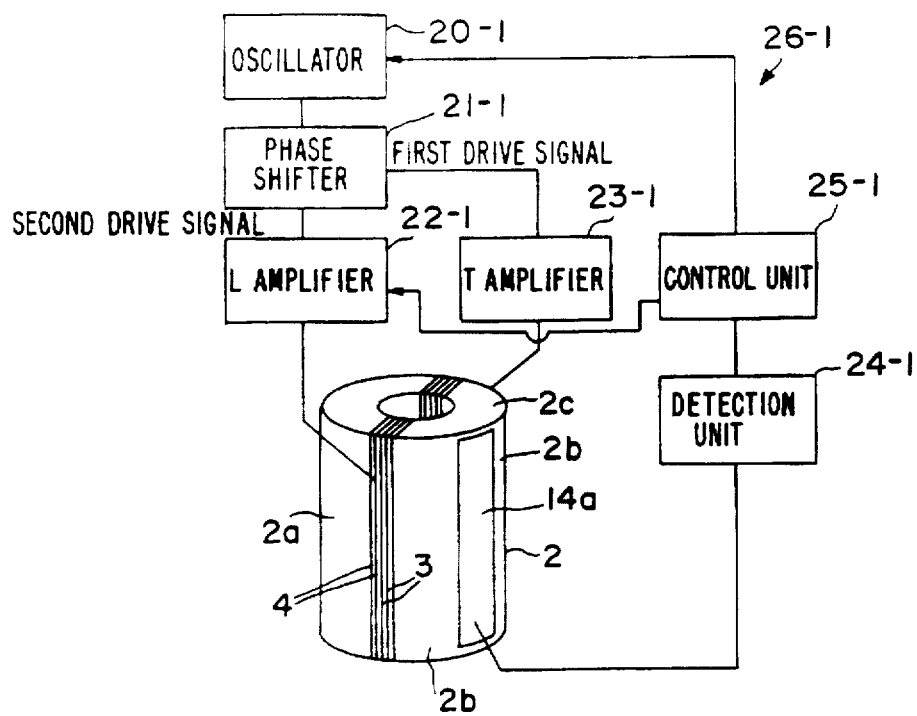
FIG. 5 is a block diagram of a vibration actuator and a control system for the vibration actuator in accordance with a second embodiment of the present invention.

FIG. 5 is a block diagram of a control system for a vibration actuator in accordance with a second embodiment of the present invention. As shown in FIG. 5, a drive control system 26-1 in accordance with the second embodiment of the present invention includes an oscillator 20-1 which generates a drive signal, a phase shifter 21-1 which divides the drive signal into a first drive signal and a second drive signal, a T amplifier 23-1 which amplifies the first drive signal for input to an electromechanical conversion element 3 for torsional vibration, and an L amplifier 22-1 which amplifies the second drive signal for input to an electromechanical conversion element 4 for longitudinal vibration. The phase shifter 21-1 causes a phase difference of (1/4) λ (wavelength) between the first drive signal and the second drive signal.

Moreover, the drive control system 26-1 includes a detection unit 24-1 which detects torsional vibration arising in the vibration element 2, and a control unit 25-1 which controls the gain of the L amplifier unit 22-1 according to the quantity of torsional vibration detected by the detection unit 24-1. The detection unit 24-1 includes an electromechanical conversion element 14a which is affixed to the sidewall of the vibration element 2. By detecting the deformation accompanying the torsional vibration, the conversion element 14a can indirectly detect torsional vibration which arises in the vibration element 2. The structure and operation of the vibration element 2, electromechanical conversion elements 3, 4, support member 5, and moving member 7 are the same as the first embodiment of the present invention and a detailed description of these elements is omitted here.

In accordance with the second embodiment of the present invention, the oscillator 20-1 generates a drive signal of controlled frequency, and the generated drive signal is divided by the phase shifter 21-1 into a first drive signal and a second drive signal which are different in phase by (1/4) λ.

The first drive signal is input to the T amplifier 23-1, and the second drive signal is input to the L amplifier 22-1. The amplified first drive signal is input to the electromechanical conversion element 3 for torsional vibration. Further, the amplified second drive signal is input to the electromechanical conversion element 4 for longitudinal vibration. The excitation of the electromechanical conversion element 3 for torsional vibration by the first drive signal generates torsional vibration in the elastic bodies 2a, 2b. The excitation of the electromechanical conversion element 4 for longitudinal vibration by the second drive signal generates longitudinal vibration in the elastic bodies 2a, 2b. As a result of the excitation of the electromechanical conversion elements 3, 4 by the first and second drive signals, an elliptical motion arises in the driving surface 2c of the vibration element 2 synthesized from the torsional vibration and the longitudinal vibration. The moving element 7, which is the relative motion member, is driven by the elliptical movement of the driving surface 2c. Specifically, the moving element 7 is in contact in a compressed state with the driving surface 2c and frictionally receives the drive force from the driving surface 2c.

The drive speed of the moving element 7 is controlled by the drive frequency of the oscillator 20-1 and by controlling the gain of the L amplifier 22-1 which controls the amplification of the second drive voltage quantity. When the drive speed of the moving element 7 is greater than a desired drive speed, the drive frequency of the oscillator 20-1 is increased separately from the resonance point, and the gain of the L amplifier 22-1 is increased. By increasing the drive frequency, the amplitudes of the torsional vibration and the longitudinal vibration become smaller. However, by making the amplification factor of the L amplifier 22-1 large, the amplitude of the longitudinal vibration can be controlled such that it does not become smaller than a predetermined range.

When the drive speed of the moving element 7 is smaller than the desired drive speed, the drive frequency of the oscillator 20-1 is reduced, approaching the resonance point, and the gain of the L amplifier 22-1 is reduced. By reducing the drive frequency, the amplitudes of the torsional vibration and the longitudinal vibration become larger. However, by making the amplification factor of the L amplifier 22-1 small, the amplitude of the longitudinal vibration can be controlled such that it does not become unnecessarily large.

In accordance with the drive control system shown in FIG. 5, changes can be made in only the component of the elliptical motion in the drive direction. The component of the elliptical motion in a direction perpendicular to the drive direction can be made about constant. Accordingly, similar to the first embodiment of the present invention, the drive speed can be increased while maintaining the necessary clutch height.

Figure 6:
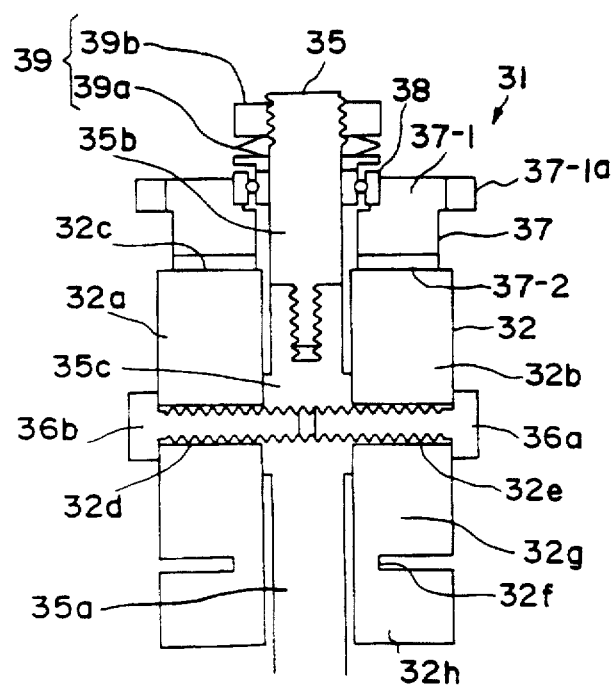
FIG. 6 is a vertical cross section of a vibration actuator in accordance with a third embodiment of the present invention.
Figure 7A:
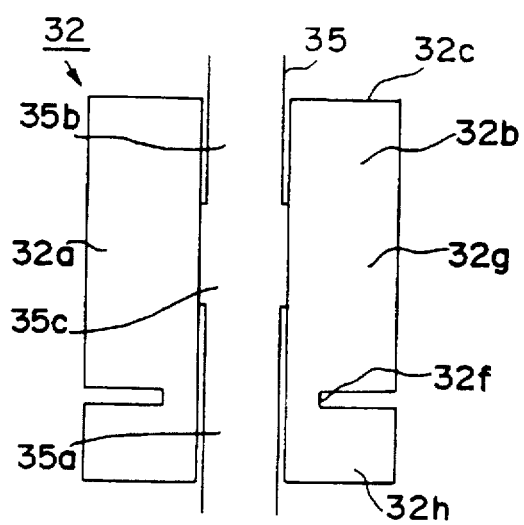
FIG. 7A is a side view of a vibration element having a first order longitudinal vibration and a second order torsional vibration caused by excitation of an electromechanical conversion element.
Figure 7B:
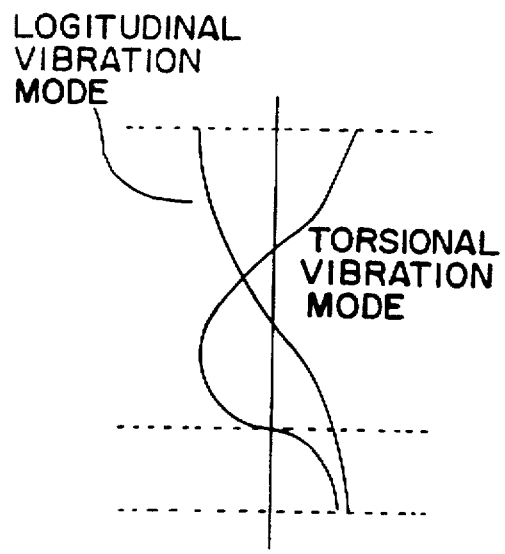
FIG. 7B is a graph showing a first order longitudinal vibration mode and a second order torsional vibration mode caused by excitation of an electromechanical conversion element.
Figure 8:
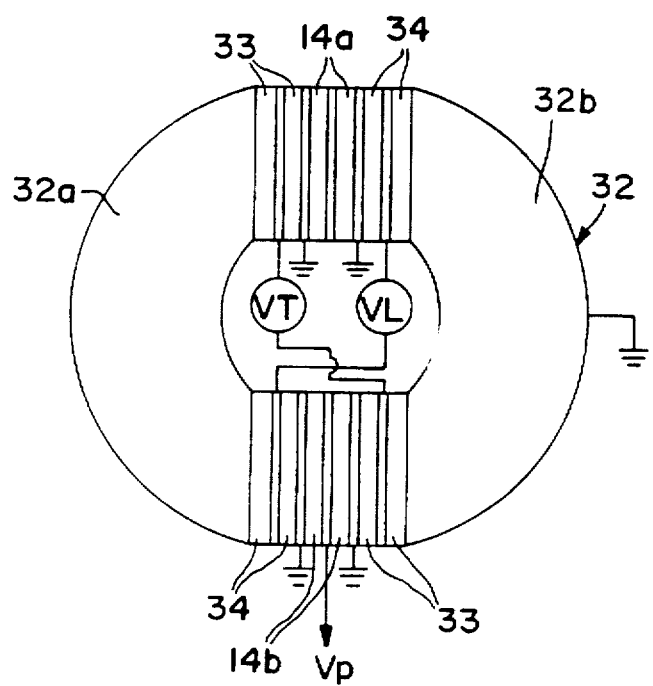
FIG. 8 is a view of a vibration element from a bottom surface direction, in accordance with embodiments of the present invention.

FIGS. 6–8 illustrate a vibration actuator in accordance with a third embodiment of the present invention. FIG. 6 is a cross sectional diagram of a vibration actuator in accordance with a third embodiment of the present invention. The structure of the vibration element 32 in accordance with the third embodiment of the present invention is different from the vibration element described with respect to the first and second embodiments.

As shown in FIG. 6, the longitudinal and torsional vibration type of vibration actuator 31 in accordance with the third embodiment of the present invention includes a vibration element 32 having plural electromechanical conversion elements 33, 34 (FIG. 8). The electromechanical conversion elements 33, 34, excited by a drive signal, function as electromechanical converters to convert electrical energy into mechanical energy. The electromechanical conversion elements 33, 34 are sandwiched between columnar elastic bodies 32a, 32b. The excitation of the electromechanical conversion elements 33, 34 causes first order longitudinal vibrations and second order torsional vibrations of the electromechanical conversion elements 33, 34, causing a drive force to be generated in a driving surface 32c of the columnar elastic bodies 32a, 32b.

The elastic bodies 32a, 32b are configured as thick-walled cylinders longitudinally divided into two, with the electromechanical conversion elements 33, 34 interposed in their plane of division. The electromechanical conversion elements 33, 34 collectively comprise four layers. Specifically, the electromechanical conversion element 33 comprises two layers, and is a torsional vibration electromechanical conversion element having a piezoelectric constant $d_{15}$. The electromechanical conversion element 34 comprises two layers, and is a longitudinal vibration electromechanical conversion element having a piezoelectric constant $d_{31}$.

A groove 32f is disposed in the elastic bodies 32a, 32b forming a portion of the vibration element 32 having a smaller diameter than the remainder of the vibration element 32. The groove 32f divides the vibration element 32 in the height direction into two portions, a first large diameter portion 32g and a second large diameter portion 32h.

Through holes 32d, 32e are formed in the elastic bodies 32a, 32b, respectively, parallel to the lamination direction of the electromechanical conversion elements 33, 34, and at about the center of the vibration element 32 in the height direction. Bolts 36a, 36b are inserted in the through holes 32e, 32d, respectively, and are screwed to a fixed shaft 35, which is inserted in the center of the vibration element 32 in the axial direction. The elastic bodies 32a, 32b are fixed with the bolts 36a, 36b to sandwich the electromechanical conversion elements 33, 34.

The moving element 37, which is a relative motion member, comprises a moving element base member 37-1, and a sliding member 37-2 which contacts the driving surface 32c of the vibration element 32. A locating member 38 is fitted into the inner circumference of the moving element base member 37-1, and is located with respect to the fixed shaft 35. The moving element 37 is forced to contact the driving surface 32c of the vibration element 32 by a compression member 39a.

The fixed shaft 35 functions as a support member for the moving element 37-1. A gearwheel 37-1a for output is disposed at the outer edge portion of the moving element base member 37-1. The motion of the gearwheel 37-1a is transmitted to a gearwheel (not shown) which is coaxial with a body to be driven.

The fixed shaft 35 fixes the vibration element 32 comprising the elastic bodies 32a, 32b which are centrally perforated in the axial direction. Further, the fixed shaft 35 includes a threaded portion formed at its end, and an adjusting member 39b is screwed on to the threaded portion of the fixed shaft 35 to adjust the amount of compression of the compression member 39a.

In accordance with the third embodiment of the present invention, the fixed shaft 35 is divided into a vibration element side 35a and a moving element side 35b, as shown in FIG. 6, in order to easily perform the operation of grinding the driving surface 32c during vibration element assembly. The vibration element side 35a of the fixed shaft 35 fixes and supports the vibration element 32. The moving element side 35b of the fixed shaft 35 does not restrain the moving element 37 in the rotational direction, and supports the moving element 37 in the radial direction so that its position is not displaced. The vibration element side 35a of the fixed shaft 35 and the moving element side 35b of the fixed shaft 35 are connected to each other via a screw connection. During final assembly after performing the operation of grinding the driving surface 32c, adhesive material is filled in between the male thread of the moving element side 35b and the female thread of the vibration element side 35a.

Moreover, in accordance with the third embodiment of the present invention, a large diameter portion 35c of the fixed shaft 35 having a diameter larger than the other portions of the fixed shaft, is formed at approximately the center of the length direction of the fixed shaft 35. The outer circumferential surface only of the large diameter portion 35c is in contact with the inner circumferential surface of the elastic bodies 32a, 32b. Thus, the contact surface area of the elastic bodies 32a, 32b and the fixed shaft 35 is reduced. Accordingly, the noise when driving the vibration actuator can be reduced, and hindering of the vibration by the support can be prevented.

FIG. 7A is a side view of the vibration element 32 in accordance with the third embodiment of the present invention. FIG. 7B is a graph illustrating the amplitudes of first order longitudinal vibration and second order torsional vibration which are brought about by excitation of the electromechanical conversion elements 33, 34.

The vibration element 32 in accordance with the third embodiment of the present invention includes a small diameter portion 32f of weak torsional rigidity, between a first large diameter portion 32g and a second large diameter portion 32h. The length of the first large diameter portion 32g is longer than the length of the second large diameter portion 32h.

The torsional vibration generated in the vibration element 32 becomes a second order mode, with nodes at two (2) places, close to the small diameter portion 32f and adjacent to about the center of the length of the first large diameter portion 32g. The longitudinal vibration generated in the vibration element 32 becomes a first order mode because the small diameter portion 32f has no affect on the longitudinal vibration, with one node at about the middle of the combined length of the first large diameter portion 32g, the second large diameter portion 32h, and the small diameter portion 32f.

As shown in FIG. 7B, the driving surface 32c becomes a large amplitude antinode of both the torsional vibration and the longitudinal vibration.

The operation of the vibration actuator 31 in accordance with the third embodiment of the present invention will now be described below. The drive control system for the vibration actuator 31 shown in FIG. 6 is the same as that shown in FIG. 1. As described above with respect to FIG. 1, the oscillator 20 generates a drive signal, and the drive signal is divided by the phase shifter 21 into a first drive signal and a second drive signal differing in phase by (1/4) λ (wavelength). The first drive signal is input to a T amplifier 23, and the second drive signal is input to an L amplifier 22. The amplified first drive signal is input to the electromechanical conversion element 33 for torsional vibration. Further, the amplified second drive signal is input to the electromechanical conversion element 34 for longitudinal vibration. The electromechanical conversion element 33 for torsional vibration is excited by the first drive signal to generate torsional vibration in the elastic bodies 32a, 32b, and the electromechanical conversion element for longitudinal vibration is excited by the second drive signal to generate longitudinal vibration in the elastic bodies 32a, 32b. As a result of the excitation of the electromechanical conversion elements 33, 34, the combined torsional vibrations and longitudinal vibrations give rise to elliptical motion in the driving surface 32c of the vibration element 32. The driving surface 32c contacts the moving element 37 in a state of compression, and the elliptical movement of the driving surface 32c provides a frictional drive force to drive the moving element 37.

The drive speed of the moving element 37 can be indirectly monitored by the signal from the piezoelectric element 14a which is affixed to the vibration element 32. When the drive speed of the moving element 37 is large, the amplitude of the torsional vibration detected by the piezoelectric element 14a is large, and a large voltage arises. In contrast, when the drive speed of the moving element 37 is small, the amplitude of the torsional vibration detected by the piezoelectric element 14a is small, and only a small voltage arises. Accordingly, based on the detected voltage quantity, the control unit 25 controls the drive speed of the moving element 37.

The drive speed of the moving element 37 can be controlled by changing the voltage quantity of the first drive signal by adjusting the gain of the T amplifier 23. When the drive speed of the moving element 37 is greater than the desired drive speed, the gain of the T amplifier 23 is reduced. However, when the drive speed of the moving element 37 is smaller than the desired drive speed, the gain of the T amplifier 23 is increased.

In accordance with vibration actuator 31 of the third embodiment of the present invention, similar to the first embodiment of the invention, when the voltage of the first drive signal is small, the amplitude of the torsional vibration becomes small. When the voltage value of the first drive signal is small, and the voltage of the second drive signal for controlling longitudinal vibration is constant, the elliptical vibration motion of the drive surface 32c changes from an oblong shape to an upright shape. Accordingly, the velocity component in the drive direction can be made small, and the speed of movement of the moving element 37 can be small.

Thus, in accordance with the third embodiment of the present invention, the amplitude of the longitudinal vibration is constant, and unrelated to the amplitude of the torsional vibration. Accordingly, the moving body 37 is unaffected by the surface roughness of the driving surface 32c. As a result, even when the voltage of the first drive signal becomes extremely small, it is possible to drive at a very low speed, and the occurrence of speed irregularities can also be suppressed.

Further, when the voltage of the first drive signal is large, the amplitude of the torsional vibration becomes large. However, because the voltage of the second drive signal for generating the longitudinal vibration is constant, the elliptical motion of the driving surface 32c changes from an upright shape to an oblong shape. Accordingly, the speed component in the drive direction can be large, and the speed of movement of the moving element 37 can be large.

A vibration actuator 31, as shown in FIG. 6, was driven at a drive frequency of 68.4 Khz, and a constant the voltage (V) for generating longitudinal vibration (second drive signal), while the voltage (V) for generating torsional vibration (first drive signal) was varied. The rotational speed (rpm) of the moving element was then measured, as well as whether or not rotation irregularity occurred, and the voltage/rotation number characteristic was found. The results are shown in Table 1.

TABLE 1

| Torsional vibration voltage (V) | Longitudinal vibration voltage (V) | Rotation speed (rpm) | Rotation irregularity |
| --- | --- | --- | --- |
| 35 | 35 | 202 | small |
| 25 | 35 | 106 | small |
| 15 | 35 | 45 | small |
| 6 | 35 | 12.3 | small |
| 3 | 35 | 4.6 | small |

Furthermore, for the sake of comparison, the minimum rotation speed (rpm) obtained and whether or not irregularity of rotation occurred were measured under various conditions. The results of these measurements are shown in Table 2. It is noted that the "minimum rotation speed" in Table 2 is the rotational speed obtained directly before the rotation is stopped, when reducing the rotational speed from the initial conditions.

TABLE 2

| Case | Drive frequency (kHz) | Torsional voltage (V) | Longitudinal Voltage (V) | Min. rotation speed (rpm) | Shape of elliptical vibration |
| --- | --- | --- | --- | --- | --- |
| initial condition | 68.4 | 35 | 35 | 202 (initial rotational speed) | |
| reduction of voltage used for torsional | 68.4 | 3 | 35 | 4.6 rotation irregularity small | |
| reduction of voltage used for longitudinal | 68.4 | 35 | 5 | 40 rotation irregularity large | |
| increase of drive frequency | 68.6 | 35 | 35 | 26.2 rotation irregularity medium | |
| torsional voltage longitudinal voltage decrease | 68.4 | 15 | 15 | 20.1 rotation irregularity medium | |
| both voltages separately reduced | 68.4 | 10 | 25 | 10 rotation irregularity small | |

It can be recognized from Table 1 and Table 2 that by reducing only the voltage of the first drive signal input to the electromechanical conversion element 33 for torsional vibration, the necessary clutch height was maintained unchanged, and the drive speed could be controlled to a very low speed region. Further, it can be recognized from the results shown in Tables 1 and 2 that the problem of speed irregularity occurring when performing low speed drive is minimized.

Figure 9:
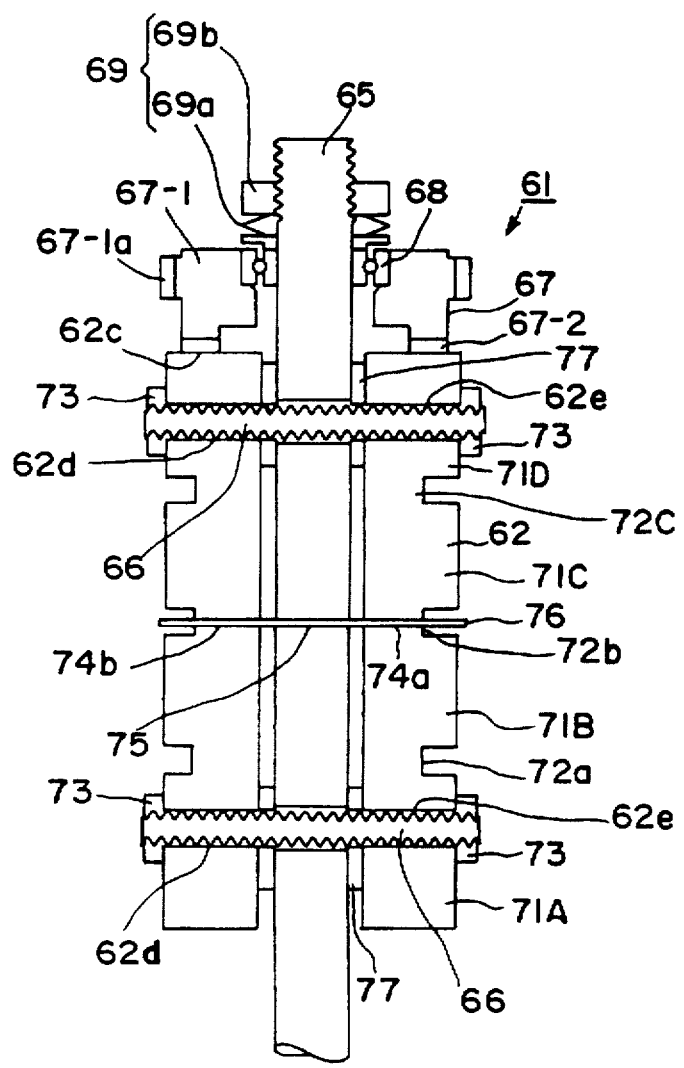
FIG. 9 is a vertical cross section of a vibration actuator in accordance with a fourth embodiment of the present invention.

FIG. 9 is a vertical cross section of a vibration actuator 61 in accordance with a fourth embodiment of the present invention.

The vibration actuator 61 includes a vibration element 62 having plural electromechanical conversion elements 63, 64 which are excited by drive signals input to the electromechanical conversion elements 63, 64. The excitation of the electromechanical conversion elements 63 causes a second order torsional vibation, and the excitation of the electromechanical conversion element 64 causes a first order longitudinal vibration. The electromechanical conversion elements 63, 64 are sandwiched by columnar elastic bodies 62a, 62b, and the electromechanical conversion elements 63, 64 generate drive forces in a driving surface 62c of the elastic bodies 62a, 62b. Neither the electromechanical conversion element 63 for torsional vibration nor the electromechanical conversion element 64 for longitudinal vibration is shown in FIG. 9, but will be described in detail with reference to FIGS. 10A–C below.

The elastic bodies 62a, 62b may comprise steel, stainless steel, phosphor bronze, or the like metallic material. The elastic bodies 62a, 62b are formed of thick-walled cylindrical tubes divided longitudinally into two, with the electromechanical conversion elements 63, 64 and an electrode 70 are inserted into their plane of division.

Grooves are disposed in three places in the surface of the elastic bodies 62a, 62b to form three small diameter portions and four large diameter portions. Specifically, during assembly of the vibration element 62 the elastic bodies 62a, 62b are formed of four large diameter portions 71A, 71B, 71C, and 71D which are separated by three small diameter portions 72a, 72b and 72c formed of the grooves.

The small diameter portions 72a, 72b and 72c are formed in positions which contain the nodal portions of second order torsional vibrations which arise in the vibration element 62. The electromechanical conversion element 63 for torsional vibration is positioned at a location which contains a nodal portion of the driving surface 62c side of the torsional vibration. Further, the electromechanical conversion element 64 for longitudinal vibration is positioned to cause approximate coincidence with the resonant frequency of the first order longitudinal vibration and the second order torsional vibration.

The vibration element 62 includes through holes 62d, 62e formed at about the center of its length in a direction parallel to the lamination direction of the electromechanical conversion element 63 for torsional vibration and the electromechanical conversion element 64 for longitudinal vibration. The elastic bodies 62a, 62b are fixed by bolts 66 inserted into the two through holes 62d, 62e and secured with nuts 73. The electromechanical conversion element 63 for torsional vibration, and the electromechanical conversion element 64 for longitudinal vibration, are inserted in between the elastic bodies 62a, 62b.

Further, the vibration element 62 includes through holes 74a, 74b formed in the elastic bodies 62b, 62a, respectively. The through holes 74a, 74b are disposed in the center of the small diameter portion 72b of the vibration element 62. A solid pin 76 in inserted in the through holes 74a, 74b, and a through hole 75 disposed in a fixed shaft 65, to fix the elastic bodies 62a, 62b to the fixed shaft 65. Tubular members 77 located between the elastic bodies 62a, 62b and the fixed shaft 65 provide support for the vibration element 62 in the radial direction of the vibration element 62.

The vibration actuator 61 includes a moving element 67 including a moving element base member 67-1 made of stainless steel, aluminum alloy or the like, formed in a thick-walled, circular annular shape. The moving element 67 also includes a sliding member 67-2 comprised principally of a high molecular material or the like, contacting the driving surface 62c of the vibration element 62. A locating member 68 is fitted into an inner circumferential portion of the moving element base member 67-1, and is set in position with respect to the fixed shaft 65 by a bearing or the like. A gear wheel 67-1a is disposed on the outer circumferential surface of the moving element base member 67-1. Th motion of the gear wheel 67-1a is transmitted to another gear wheel (not shown) which is a body to be driven. The moving element 67 is forced to contact the driving surface 62c of the vibration element 62 by a disc spring, coil spring, plate spring or the like compression member 69a which compresses the moving element 67 against the driving surface 62c.

The columnar fixed shaft 65 passes through a hollow portion formed in the length direction (axial direction) of the vibration element 62, and supports the elastic bodies 62a, 62b using the fixed pin 76 and the tubular member 77. Further, a threaded portion is formed in a portion of the fixed shaft 65, and an adjusting member 69b is threaded onto the threaded portion of the fixed shaft 65 to adjust the amount of compression of the compression member 69.

FIGS. 10A and 10B show a top view and a side view, respectively, of the vibration element 62 showing the location of the electromechanical conversion elements 63, 64 in accordance with the fourth embodiment of the present invention.

As described above, the vibration element 62 includes four large diameter portions 71A–D and three small diameter portions 72a–72c formed in a thick walled cylindrical body. As shown in FIGS. 10A and 10B, two layers of electromechanical conversion elements 63 for generating torsional vibration, and two layers of electromechanical converting elements 64 for generating longitudinal vibration, and an electrode 70, are interposed between the elastic bodies 62a, 62b which comprise the vibration element 62.

The small diameter portions 72a–72c are formed in the nodal positions of the torsional vibration generated in the vibration element 62. Furthermore, the electromechanical conversion element 63 for torsional vibration, is positioned to extend over the nodal positions of the driving surface 62c side of the torsional vibration. The electromechanical conversion element 64 for longitudinal vibration is positioned to extend over the node(s) of the longitudinal vibration generated in the vibration element 62.

The electromechanical conversion element 63 for torsional vibration has a piezoelectric constant $d_{15}$. When a drive signal is input to the electromechanical conversion element 63 it undergoes shearing deformation according to the direction of the voltage to generate torsional vibration.

The electromechanical conversion element 64 for longitudinal vibration has a piezoelectric constant $d_{31}$. When a drive signal is input to the electromechanical conversion 64 it undergoes shearing deformation according to the direction of the voltage to generate longitudinal vibration.

Plural electromechanical conversion elements 63 for torsional vibration are positioned between the elastic bodies 62a, 62b. Specifically, as shown in FIG. 10A, the plural electromechanical conversion elements 63 for torsional vibration include two electromechanical conversion elements 63a for torsional vibration in the foreground, and two electromechanical conversion elements 63b for torsional vibration in the background. When a voltage is impressed in the same direction on the electromechanical conversion elements 63a and the electromechanical conversion elements 63b, the shearing deformations which are respectively generated are oriented in opposite directions. As a result, the drive signal input causes a torsional deformation in some direction to be generated in the vibration element 62.

For example, as shown in FIG. 10A, when the electromechanical conversion elements 63a and the electromechanical conversion elements 63b generate shearing deformations, the driving surface 62c executes torsional motion in the direction shown by the arrow in FIG. 10A. Moreover, when a voltage is impressed in the opposite direction, because shearing deformations are generated in the opposite direction, the driving surface 62c executes torsional motion in a direction opposite to that shown by the arrow in FIG. 10A.

Plural electromechanical conversion elements 64 for longitudinal vibration are positioned in a manner similar to the electromechanical conversion elements 63 for torsional vibration. Specifically, the electromechanical conversion elements 64 for longitudinal vibration include two electromechanical conversion elements 64a for longitudinal vibration in the foreground, and two electromechanical conversion elements 64b for longitudinal vibration in the background. When a voltage is impressed in the same direction on the electromechanical conversion elements 64a and the electromechanical conversion elements 64b, the respectively generated elongation and contraction deformations (longitudinal deformations) are generated such that they are in the same direction. Accordingly, when the same drive signals are input to the electromechanical conversion elements 64 for longitudinal vibration, a first order longitudinal vibration mode is easily generated.

Further, in accordance with the fourth embodiment of the present invention, by making the size of the electromechanical conversion elements 63 for torsional vibration smaller than the electromechanical conversion elements 64 for longitudinal vibration, the surface area of the electromechanical conversion elements 63 is made smaller than the surface area of the electromechanical conversion elements 64.

FIG. 11 is a block diagram of a control system for the vibration actuator and an exploded view of the vibration element 62 in accordance with the fourth embodiment of the present invention. FIG. 11 shows the respective locations of the elastic bodies 62a and 62b, the electromechanical conversion elements 63 and 64, and the electrode 70. Further, as shown in FIG. 11, the vibration actuator includes piezoelectric bodies 80a and 80b for detecting longitudinal vibration, and piezoelectric bodies 81a and 81b for detecting torsional vibration. The piezoelectric bodies 81a and 81b which detect torsional vibration detect the vibrational state of torsional vibration generated by the electromechanical conversion elements 63. Further, in FIG. 11, there are portions of the figure which are hidden from view. However, since the vibration element 62 is symmetrical in form, the hidden portions are identical to the portions explicitly shown in FIG. 11.

As shown in FIG. 11, the torsional vibration electromechanical conversion elements 63, the longitudinal vibration electromechanical conversion elements 64, the piezoelectric bodies 80a and 80b for longitudinal vibration detection, the piezoelectric bodies 81a and 81b for torsional vibration detection, and the electrode 70, are interposed between the two elastic bodies 62a, 62b which are of divided hemicylindrical form. The electromechanical conversion elements 63 comprise the electromechanical conversion elements 63a and the electromechanical conversion elements 63b. The electromechanical conversion elements 64 comprise the electromechanical conversion elements 64a and the electromechanical conversion elements 64b. The electrode 70 comprises electrodes 70-2a and 70-2b to input drive signals to the torsional vibration electromechanical conversion elements 63a and 63b, respectively, and electrodes 70-1a and 70-1b to input drive signals to the longitudinal vibration electromechanical conversion elements 64a and 64b, respectively.

Further, the electrode 70 comprises electrodes 70-3a and 70-3b joined to the piezoelectric bodies 80a and 80b, respectively, for longitudinal vibration detection, and electrodes 70-4a and 70-4b, joined to the piezoelectric bodies 81a and 81b, respectively, for torsional vibration detection. The elastic bodies 62a and 62b, the torsional vibration electromechanical conversion elements 63, the longitudinal vibration electromechanical conversion elements 64, and the electrodes 70, are respectively bonded with adhesive.

The piezoelectric bodies 81a, 81b for torsional vibration detection are located on the driving surface 62c side from the electromechanical conversion elements 63a, 63b. Moreover, the piezoelectric bodies 80a, 80b for longitudinal vibration detection are located toward the side of the vibration element 62 opposite to the driving surface 62c, and below the longitudinal vibration electromechanical conversion elements 64a, 64b in the height direction.

The electromechanical conversion elements 63a, 63b, 64a, 64b, and the piezoelectric bodies 80a, 80b, 81a and 81b form two layers. Further, from the driving surface 62c side of the vibration element 62, the piezoelectric bodies 81 for torsional vibration detection, the torsional vibration electromechanical conversion elements 63, the longitudinal vibration electromechanical conversion elements 64, and the piezoelectric bodies 80 for longitudinal vibration detection, are located in succession.

The electrodes 70-1a and 70-1b, 70-2a and 70-2b are positioned so that they can input drive signals simultaneously with respect to the torsional vibration electromechanical conversion elements 63 in two different layers and to the longitudinal vibration electromechanical conversion elements 64 in two different layers. Moreover, the electrodes 70-3a, 70-3b, and the electrodes 70-4a, 70-4b are positioned so that they can detect voltages generated according to the vibration state of the vibration element 62.

The vibration actuator 61 in accordance with the fourth embodiment of the present invention has a reduced number of components and requires simplified assembly because the electromechanical conversion elements 63, 64 are laminated in two layers. Furthermore, the number of adhesive layers required between elastic bodies 62a and 62b, the torsional vibration electromechanical conversion elements 63, the longitudinal vibration electromechanical conversion elements 64, and the electrodes 70 can be reduced to four layers from the eight layers of the first and second embodiments of the present invention.

Moreover, the operation of generating elliptical motion in the driving surface 62c with the vibration actuator 61 in accordance with the fourth embodiment of th present invention is similar to that described with respect to the first embodiment of the invention.

The drive control system shown in FIG. 11 includes an oscillator 20-2 which generates drive signals, and a phase shifter 21-2 which divides the signal from the oscillator 20-2 into a first drive signal and a second drive signal. A T amplifier 23-2 amplifies the first drive signal and inputs the amplified first drive signal to the torsional vibration electromechanical conversion elements 63. A longitudinal vibration amplifier 22-2 amplifies the second drive signal and inputs the amplified second drive signal to the longitudinal vibration electromechanical conversion elements 64. Further, the drive control system includes a speed instruction unit 91 which supports the drive speed of the moving element 67, a drive frequency control unit 94 which receives a signal from the speed instruction unit 91 and controls the drive frequency of the oscillator 20-2, a T voltage control unit 93 which controls the voltage of the first drive signal, and an L voltage control unit 92 which controls the voltage of the second drive signal.

Furthermore, the drive control system shown in FIG. 11 includes a detection unit 24-2 to detect the drive speed of the moving element 67. The detection unit 24-2 detects drive speed of the moving element 67 by detecting the torsional vibration generated in the vibration element 62 based on the voltage of the signals output from the piezoelectric bodies 81a, 81b for torsional vibration detection. More specifically, the piezoelectric bodies 81a, 81b for torsional vibration detection generate a voltage according to the displacement of the vibration element 62 generated accompanying the torsional vibration. Accordingly, the amount of displacement which arises in the vibration element 62 can be indirectly detected by the voltage quantity generated by the piezoelectric bodies 81a, 81b.

In accordance with the drive control system shown in FIG. 11, the oscillator 20-2 generates a frequency controlled drive signal, and the generated drive signal is divided by the phase shifter 21 into a first and a second drive signal which are (1/4) λ different in phase. The first drive signal is input to the T amplifier 23-2, and the second drive signal is input to the L amplifier 22-2. The amplified first drive signal is then input to the torsional vibration electromechanical conversion elements 63. Moreover, the amplified second drive signal is input to the longitudinal vibration electromechanical conversion elements 64. Accordingly, the torsional vibration electromechanical conversion elements 63 are excited to generate a torsional vibration of the elastic bodies 62a, 62b according to the first drive signal, and the longitudinal vibration electromechanical conversion elements 64 are excited to generate a longitudinal vibration of the elastic bodies 62a, 62b according to the second drive signal. As a result of the longitudinal and torsional vibration generated by the electromechanical conversion elements 63, 64, the driving surface 62c of the vibration element 62 undergoes an elliptical motion as a result of the combined torsional vibration and longitudinal vibration. The moving element 67 is in contact with the driving surface 62c and is driven frictionally by the elliptical motion of the driving surface 62c.

The drive speed of the moving element 67 is indirectly detected by the signals from the piezoelectric bodies 81a, 81b for torsional vibration detection. When the drive speed of the moving element 67 is high, the amplitude of the torsional vibration is large, and a large voltage is generated by the piezoelectric bodies 81a, 81b. In contrast, when the drive speed of the moving element 67 is small, the amplitude of the torsional vibration is small, and only a small voltage is generated by the piezoelectric bodies 81a, 81b.

In accordance with the fourth embodiment of the present invention, the drive speed instruction unit 91 controls the drive speed of the moving element 67 in accordance with the voltage quantity detected by the piezoelectric bodies 81a, 81b.

Figure 12:
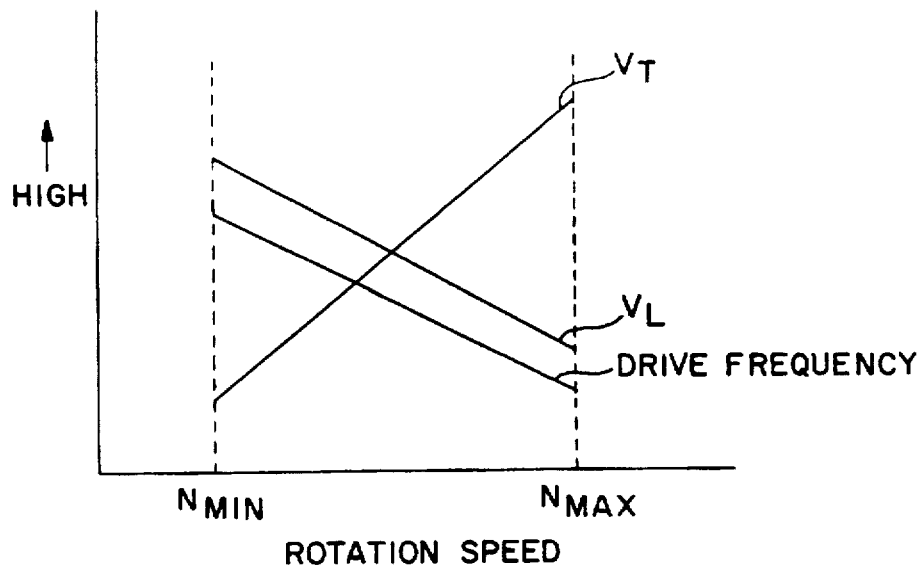
FIG. 12 is a graph illustrating a relationship between a voltage of a first drive signal, a voltage of a second drive signal, and a drive frequency of the first and second drive signals, and the relative motion speed (rotation speed), in accordance with the fourth embodiment of the present invention.

FIG. 12 is a graph illustrating a relationship between the voltage of the first drive signal $V_T$, the voltage of the second drive signal $V_L$ and the drive frequency when the drive speed of the moving element 67 is made small according to the instruction from the speed instruction unit 91.

When the drive speed of the moving element 67 is larger than the desired speed, the speed instruction unit 91, via the drive frequency control unit 94, makes the drive frequency in the oscillator 20-2 large and separates the drive frequency from the resonance point. Furthermore, the gain of the T amplifier 23 is gradually reduced via the T voltage control unit 93, and the gain of the L amplifier 22-2 is gradually increased via the L voltage control unit 92. Accordingly, the amplitude of the torsional vibration and longitudinal vibration become small, but because the gain of the L amplifier 22-2 is made large, the amplitude of the longitudinal vibration can be disposed within a predetermined range.

It becomes difficult to excite the electromechanical conversion elements, generally, without impressing some degree of size of voltage. In accordance with the fourth embodiment of the present invention, even in a state in which the voltage of the first drive signal for torsional vibration was made higher than that at which excitation is possible, the component in the drive direction of the elliptical motion generated in the driving surface 62c can be made small by making the drive frequency large. Moreover, when the drive frequency becomes large, the component of the elliptical motion perpendicular to the drive direction (component in the pressure direction) becomes small. However, by making the gain of the L amplifier 22-2 large, the component perpendicular to the drive direction can be maintained in a predetermined range.

When the drive speed of the vibration element 67 is smaller than the desired speed, the speed instruction unit 91, via the drive frequency control unit 94, reduces the frequency in the oscillator 20-2 to approach the resonance point. Furthermore, the gain of the T amplifier 23-2 is gradually increased via the T voltage control unit 93, and the gain of the L amplifier 22-2 is gradually decreased via the L voltage control unit 92. In the above-described manner, the amplitudes of the torsional vibration and longitudinal vibration become large, but by reducing the gain of the L amplifier 22-2, the amplitude of the longitudinal vibration does not become greater than the predetermined range.

Figure 13:
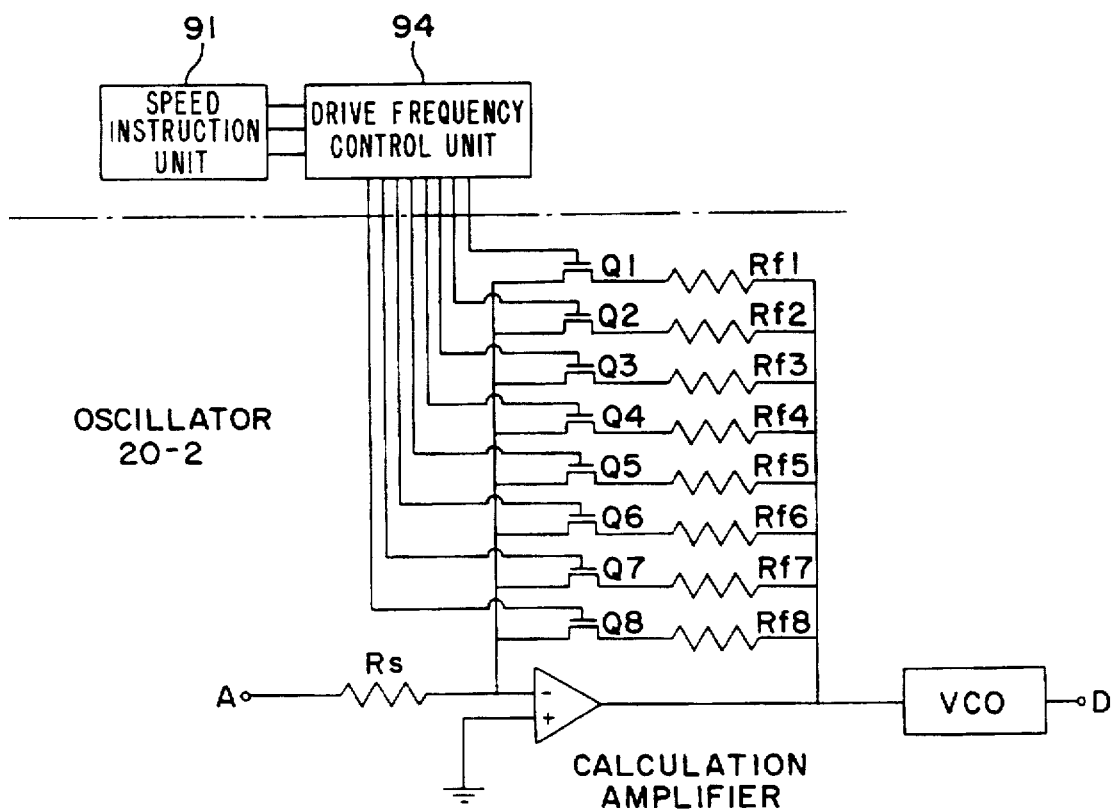
FIG. 13 is a circuit diagram of a device to change a drive frequency of a drive signal in accordance with the fourth embodiment of the present invention.

FIG. 13 is a circuit diagram of a device to change a drive frequency of a drive signal in accordance with a fourth embodiment of the present invention.

The device to change the drive frequency of a drive signal includes the drive frequency control unit 94, which may be a multiplexer, to receive a signal from the speed instruction unit 91 which selects an output from the drive frequency control unit 94. Specifically, in accordance with a signal from the speed instruction unit 91, the drive frequency control unit 94 selects one of switching elements Q1-Q8 connected to the drive frequency control unit 94, which are MOS field effect transistors or the like, to be set ON-OFF. Resistors Rf1-Rf8 having different resistance values are connected in parallel to the return portion of the calculation amplifier. Further, each resistor Rf1-Rf8 is series connected to respective switching elements Q1-Q8. When a switching element Q1-Q8 is set ON according to the control signal of the drive frequency control unit 94, a corresponding resistor Rf1-Rf8 is connected to the feedback of the calculation amplifier to set the gain of the calculation amplifier. Accordingly, a drive signal input to the terminal A of the calculation amplifier is amplified by the calculation amplifier, and is input to a voltage controlled amplifier (VCO). The VCO outputs a frequency from the terminal D according to the voltage value of the signal which has been input.

The operation of changing the drive frequency of the drive signal generated by the oscillator 20-2 will now be described with reference to FIG. 13. Firstly, the case in which the drive frequency is high will be described. In accordance with instructions from the speed instruction unit 91, the drive frequency control unit 94 sets ON a respective switching element Q1–Q8 to set the amplification factor to become high, and sets the other switching elements OFF. The voltage of the signal input to the VCO becomes large, and the frequency of the drive signal becomes high.

The case of reducing the drive frequency will now be described. In accordance with an instruction from the speed instruction unit 91, the drive frequency control unit 94 sets ON a respective switching element Q1–Q8 to set the amplification factor to become small, and sets the other switching elements OFF. The voltage of the signal input to the VCO becomes small, and the frequency of the drive signal becomes low.

In accordance with the fourth embodiment of the present invention, the digital signal from the speed instruction unit is assumed to be three (3) bits, allowing the selection of the eight (8) switching elements Q1–Q8 and resistors Rf1–Rf8. However, the present invention is not limited to selecting eight switching elements Q and resistors R. For example, the digital signal may be four (4) bits, allowing selection of up to sixteen (16) switching elements and resistors. The more numerous the numbers of bits, switching elements and resistors, the finer the possible control.

Figure 14:
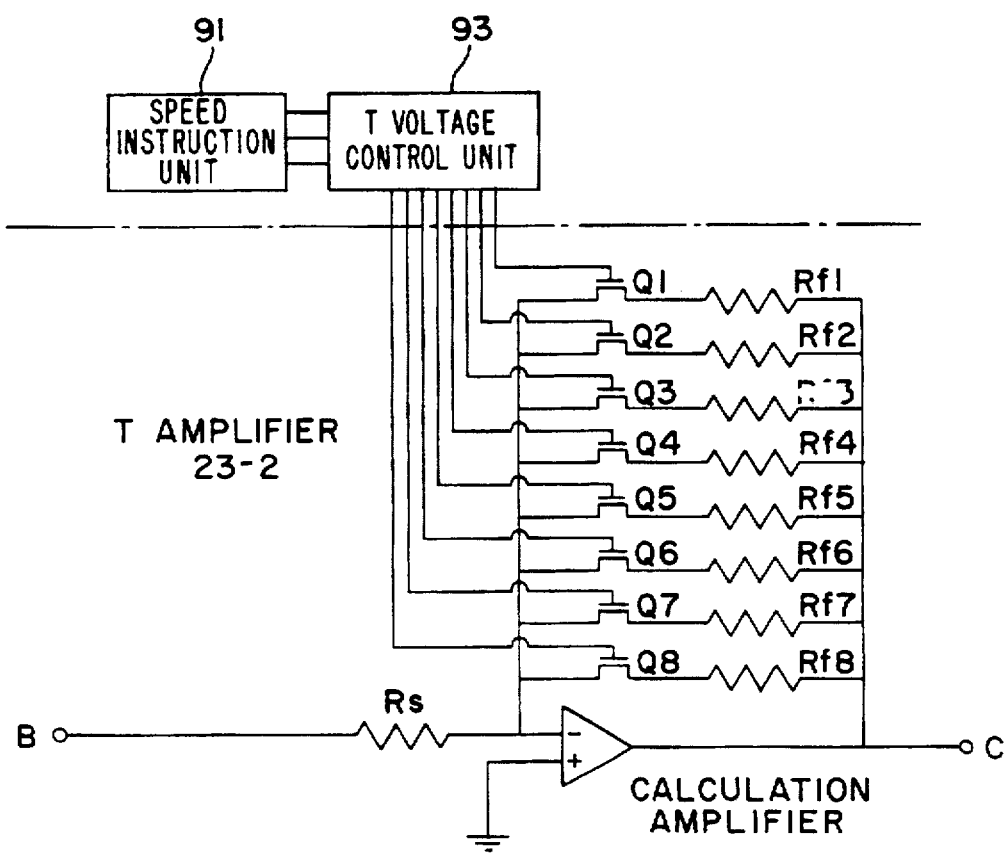
FIG. 14 is a circuit diagram of a device to change a voltage of the first drive signal in accordance with the fourth embodiment of the present invention.
Figure 15:
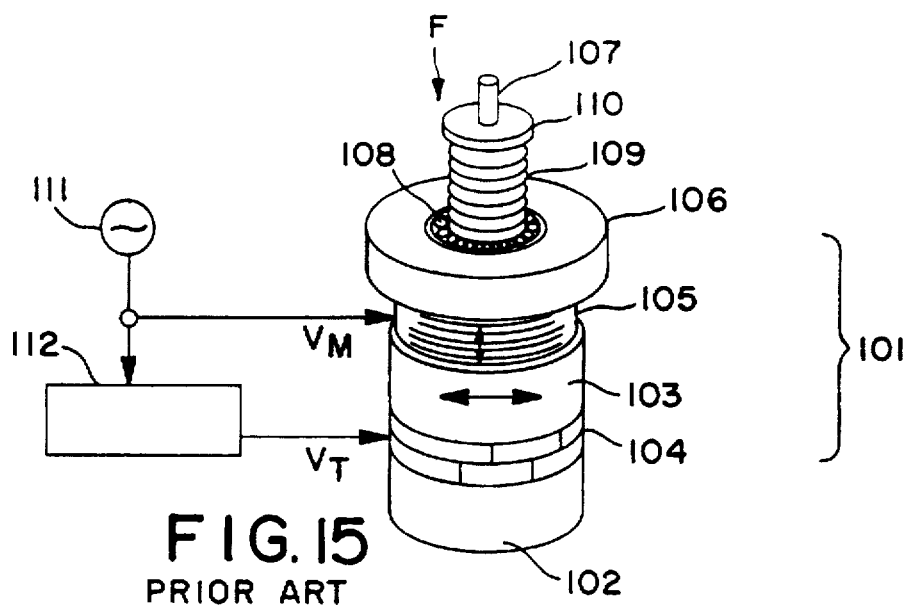
FIG. 15 is an oblique diagram of a conventional longitudinal and torsional vibration type vibration actuator.
Figure 16:
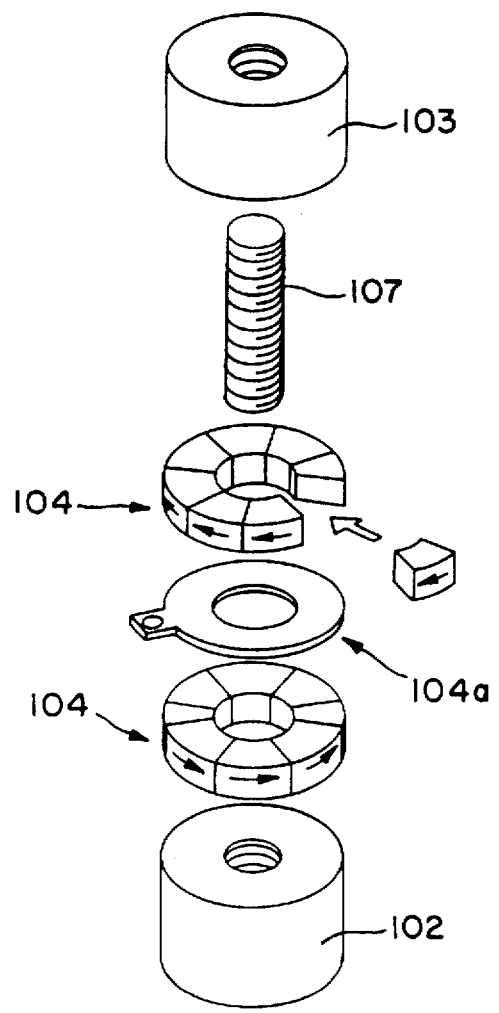
FIG. 16 is an oblique diagram showing an exploded view of a stator of the vibration actuator shown in FIG. 15.

FIG. 14 is a circuit diagram of a device to change a voltage of the first drive signal in accordance with the fourth embodiment of the present invention.

The device to change the voltage of the first drive signal includes the T voltage conrol unit 93, which may be a multiplexer, which receives an instruction from the speed instruction unit 91. The T voltage control unit 93 selects a signal output based on the instruction from the speed instruction unit 91. Switching elements Q1–Q8, which are MOS field effect transistors or the like, are set ON-OFF in accordance with the selected output of the T voltage control unit 93. Resistors Rf1–Rf8 having different resistance values are connected in parallel to the return portion of the calculation amplifier. Further, each resistor Rf1–Rf8 is series connected to the respective switching elements Q1–Q8. When a switching element Q1–Q8 is ON according to the control signal of the T voltage control unit 93, the corresponding resistor Rf1–Rf8 is feedback connected to the calculation amplifier to set the gain of the amplifier. Accordingly, the first drive signal, which is input to the terminal B from the phase shifter 21-2, is amplified by the calculation amplifier, and is output to the electrodes 70-4a and 70-4b joined to the torsional vibration electromechanical conversion elements 63 via the terminal C.

The operation of changing the voltage of the first drive signal will now be described with reference to FIG. 14.

Firstly, the case in which the voltage is decreased will be described. The speed instruction unit 91 issues an instruction to the T voltage control unit 93 to set ON a respective switching element Q1–Q8 for the amplification factor to become smaller, and sets the other switching elements OFF. Accordingly, the voltage of the first drive signal output to the electrodes 70-4a and 70-4b becomes smaller.

The case in which the voltage is increased will now be described. The speed instruction unit 91 issues an instruction to the T voltage control unit 93 to set ON a respective switching element Q1–Q8 for the amplification factor to become larger, and sets the other switching elements OFF. Accordingly, the voltage of the first drive signal output to the electrodes 70-4a and 70-4b becomes larger.

The digital signal is input to the T voltage control unit 93 from the speed instruction unit 91 is assumed to be three (3) bits, allowing up to eight (8) switching elements Q1–Q8 and resistors Rf1–Rf8 to be selected. However, the present invention is not limited to selecting eight switching elements Q and resistors R. As described above, the digital signal from the speed instruction unit may be four (4) bits, allowing selection of sixteen (16) switching elements and resistors. The more numerous the numbers of bits, switching elements and resistors, the finer the possible control.

In accordance with embodiments of the present invention, piezoelectric bodies have been used as the electromechanical conversion elements. However, the invention is not limited to using piezoelectric bodies as the electromechanical conversion elements. For example, electrostrictive or magnetostrictive elements may be used, or any other device which changes electrical energy into mechanical deformations.

Moreover, the detection piezoelectric elements which detect the vibration state of the elastic bodies, as shown in FIG. 8, may be piezoelectric bodies 14a, 14b, located such that they are laminated between the torsional vibration electromechanical conversion elements 3 and the longitudinal vibration electromechanical conversion elements 4.

Although preferred embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. A vibration actuator, comprising:

an elastic body;

vibration element joined to the elastic body;

drive system to output a drive signal to the vibration element; and a relative motion member in contact with a driving surface of the elastic body and which is driven by the driving surface, wherein the drive system excites the vibration element with a first drive signal and a second drive signal to respectively produce a first vibration mode and a second vibration mode, wherein displacement of the driving surface occurs in a direction about the same as the drive direction of the relative motion member in the first vibration mode, and displacement of the driving surface occurs in a direction intersecting the driving surface in the second vibration mode causing relative motion between the vibration element and the relative motion member, and the drive system controls a voltage of at least one of the first drive signal and the second drive signal to independently adjust the voltage of at least one of the first drive signal and the second drive signal.

2. The vibration actuator as recited in claim 1, wherein the respective voltages of the first drive signal and the second drive signal are controlled mutually independently.

3. The vibration actuator as recited in claim 1, wherein the drive system generates the first vibration mode by the first drive signal, and generates the second vibration mode by the second drive signal, and the voltage of the second drive signal is controlled so that the amplitude of vibration of the second vibration mode is within a predetermined range.

4. The vibration actuator as recited in claim 1, wherein the drive system generates the first drive signal having a voltage which reduces the amplitude of vibration of the first vibration mode.

5. The vibration actuator as recited in claim 1, wherein the drive system controls the frequency of at least one of the first drive signal and second drive signal.

6. The vibration actuator as recited in claim 1, wherein the elastic body comprises two columnar elastic bodies and the vibration element comprises an electromechanical conversion element, and a portion of the electromechanical conversion element is interposed between the two columnar elastic bodies, and the first vibration mode is a m-th order torsional vibration mode having a rotation axis in about the same position as the central axis of the elastic bodies, and the second vibration mode is a n-th order longitudinal vibration mode generating a displacement in about the axial direction of the rotation axis, where m and n are optional integers.

7. The vibration actuator as recited in claim 1, wherein the vibration arising in the elastic body is a first order longitudinal vibration and a first order torsional vibration, or a first order longitudinal vibration and a second order torsional vibration.

8. The vibration actuator as recited in claim 1, wherein the drive system changes a voltage of the first drive signal to control a relative motion speed of the elastic body and the relative motion member.

9. The vibration actuator as recited in claim 8, wherein the drive system makes the first drive signal large when the relative motion speed of the elastic body and the relative motion member is large.

10. The vibration actuator as recited in claim 8, wherein the drive system makes the first drive signal small when the relative motion speed of the elastic body and the relative motion member is small.

11. The vibration actuator as recited in claim 5, wherein the drive system varies a frequency of the first drive signal and the second drive signal, and varies a voltage of the second drive signal, thereby controlling a relative motion speed of the elastic body and the relative motion member.

12. The vibration actuator as recited in claim 11, wherein the drive system sets the frequency of the first drive signal and the second drive signal low, and sets the voltage of the second drive signal large thereby making the relative motion speed of the elastic body and relative motion member large.

13. A vibration actuator as recited in claim 11, wherein the drive system sets the frequency of the first drive signal and the second drive signal high, and sets the voltage of the second drive signal small, thereby making the relative motion speed of the elastic body and the relative motion member small.

14. A method of controlling a vibration actuator including an elastic body, a vibration element joined to the elastic body and a relative motion member which is driven by a driving surface of the elastic body, comprising the steps of:

generating a first drive signal to produce a first vibration mode causing displacement of the driving surface of the elastic body in about the same direction as the relative motion member is driven;

generating a second drive signal to produce a second vibration mode causing displacement of the driving surface of the elastic body in a direction which intersects the driving surface of the elastic body; and independently adjusting a voltage of at least one of the first drive signal and the second drive signal to produce relative motion between the elastic body and relative motion member in accordance with the first and second vibration modes.

15. The method of controlling a vibration actuator as recited in claim 14, wherein generating the first vibration mode comprises generating a first drive signal; and generating the second vibration mode comprises generating a second drive signal having a voltage which is controlled such that the amplitude of vibration of the second vibration mode is within a predetermined range.

16. The method of driving a vibration actuator as recited in claim 14, wherein generating the first vibation mode comprises generating a first drive signal having a voltage which is controlled such that the amplitude of vibration of the first vibration mode is reduced.

17. The method of driving a vibration actuator as recited in claim 14, wherein generating the first vibration mode comprises generating a first drive signal; and generating the second vibration mode comprises generating a second drive signal, wherein the frequency of at least one of the first drive signal and the second drive signal is controlled.

18. The method of driving the vibration actuator as recited in claim 14, wherein generating the first vibration mode comprises generating a first drive signal, and controlling the relative motion comprises changing the voltage of the first drive signal to control the relative motion speed of the elastic body and relative motion member.

19. The method of driving vibration actuator as recited in claim 18, wherein controlling the relative motion comprises making the voltage of the first drive signal large to make the relative motion speed of the elastic body and relative motion member large.

20. The method of driving vibration actuator as recited in claim 18, wherein controlling the relative motion comprises making the voltage of the first drive signal small to make the relative motion speed of the elastic body and the relative motion member small.

21. The method of controlling vibration actuator as recited in claim 17, wherein by changing the frequency of the first drive signal and second drive signal, and by changing the voltage of the second drive signal, the relative motion speed of the elastic bodies and relative motion member is controlled.

22. The method of driving the vibration actuator as recited in claim 17, wherein when the relative motion speed of the elastic bodies and relative motion member is made large, the frequency of the first drive signal and second drive signal is made low, and the voltage of the second drive signal is made large.

23. The method of driving the vibration actuator as recited in claim 17, wherein when the relative motion speed of the elastic bodies and relative motion member is made small, the frequency of the first drive signal and second drive signal is made high, and the voltage of the second drive signal is made small.

* * * * *